US012533164B2

(12) United States Patent
Lopez Camacho et al.

(10) Patent No.: US 12,533,164 B2
(45) Date of Patent: Jan. 27, 2026

(54) ADJUSTABLE IMPLANT

(71) Applicant: NuVasive Specialized Orthopedics, Inc., San Diego, CA (US)

(72) Inventors: Jorge Lopez Camacho, Oxnard, CA (US); Shawn Placie, Aliso Viejo, CA (US)

(73) Assignee: NuVasive Specialized Orthopedics, Inc., San Diego, CA (US)

( * ) Notice: Subject to any disclaimer, the term of this patent is extended or adjusted under 35 U.S.C. 154(b) by 315 days.

(21) Appl. No.: 18/142,762

(22) Filed: May 3, 2023

(65) Prior Publication Data

US 2024/0366273 A1    Nov. 7, 2024

(51) Int. Cl.
| | | |
|---|---|---|
| *A61B 17/72* | (2006.01) | |
| *A61B 17/66* | (2006.01) | |
| *A61B 17/68* | (2006.01) | |
| *A61B 17/00* | (2006.01) | |
| *A61B 90/00* | (2016.01) | |

(52) U.S. Cl.
CPC ............ *A61B 17/72* (2013.01); *A61B 17/66* (2013.01); *A61B 17/7216* (2013.01); *A61B 2017/00398* (2013.01); *A61B 2017/00734* (2013.01); *A61B 2017/681* (2013.01); *A61B 2090/064* (2016.02)

(58) Field of Classification Search
None
See application file for complete search history.

(56) References Cited

U.S. PATENT DOCUMENTS

| | | |
|---|---|---|
| 2,702,031 A | 2/1955 | Wenger |
| 3,111,945 A | 11/1963 | Von Solbrig |
| 3,372,476 A | 3/1968 | Peiffer |
| 3,377,576 A | 4/1968 | Langberg |
| 3,512,901 A | 5/1970 | Law |
| 3,597,781 A | 8/1971 | Eibes |
| 3,900,025 A | 8/1975 | Barnes, Jr. |
| 3,915,151 A | 10/1975 | Kraus |
| RE28,907 E | 7/1976 | Eibes et al. |
| 3,976,060 A | 8/1976 | Hildebrandt et al. |
| 4,010,758 A | 3/1977 | Rockland et al. |
| 4,056,743 A | 11/1977 | Clifford et al. |
| 4,068,821 A | 1/1978 | Morrison |
| 4,078,559 A | 3/1978 | Nissinen |

(Continued)

FOREIGN PATENT DOCUMENTS

| | | |
|---|---|---|
| CN | 1697630 A | 11/2005 |
| CN | 101040807 A | 9/2007 |

(Continued)

OTHER PUBLICATIONS

Abe et al., "Experimental external fixation combined with percutaneous discectomy in the management of scoliosis.", SPINE, 1999, pp. 646-653, 24, No. 7.

(Continued)

*Primary Examiner* — Tessa M Matthews

(57) ABSTRACT

One aspect of the disclosure relates to an aspect of the disclosure relates to an adjustable implant including: a housing; a first adjustable member at least partially positioned within the housing and moveable relative to the housing; and a first actuation assembly positioned within the first adjustable member and configured to move the first adjustable member relative to the housing.

19 Claims, 10 Drawing Sheets

(56) References Cited

U.S. PATENT DOCUMENTS

| | | | |
|---|---|---|---|
| 4,204,541 A | 5/1980 | Kapitanov |
| 4,357,946 A | 11/1982 | Dutcher et al. |
| 4,386,603 A | 6/1983 | Mayfield |
| 4,448,191 A | 5/1984 | Rodnyansky et al. |
| 4,486,176 A | 12/1984 | Tardieu et al. |
| 4,501,266 A | 2/1985 | McDaniel |
| 4,522,501 A | 6/1985 | Shannon |
| 4,537,520 A | 8/1985 | Ochiai et al. |
| 4,550,279 A | 10/1985 | Klein |
| 4,561,798 A | 12/1985 | Elcrin et al. |
| 4,573,454 A | 3/1986 | Hoffman |
| 4,592,355 A | 6/1986 | Antebi |
| 4,595,007 A | 6/1986 | Mericle |
| 4,642,257 A | 2/1987 | Chase |
| 4,658,809 A | 4/1987 | Ulrich et al. |
| 4,700,091 A | 10/1987 | Wuthrich |
| 4,747,832 A | 5/1988 | Buffet |
| 4,854,304 A | 8/1989 | Zielke |
| 4,904,861 A | 2/1990 | Epstein et al. |
| 4,931,055 A | 6/1990 | Bumpus et al. |
| 4,940,467 A | 7/1990 | Tronzo |
| 4,957,495 A | 9/1990 | Kluger |
| 4,973,331 A | 11/1990 | Pursley et al. |
| 5,010,879 A | 4/1991 | Moriya et al. |
| 5,030,235 A | 7/1991 | Campbell, Jr. |
| 5,041,112 A | 8/1991 | Mingozzi et al. |
| 5,064,004 A | 11/1991 | Lundell |
| 5,074,882 A | 12/1991 | Grammont et al. |
| 5,092,889 A | 3/1992 | Campbell, Jr. |
| 5,133,716 A | 7/1992 | Plaza |
| 5,142,407 A | 8/1992 | Varaprasad et al. |
| 5,156,605 A | 10/1992 | Pursley et al. |
| 5,263,955 A | 11/1993 | Baumgart et al. |
| 5,290,289 A | 3/1994 | Sanders et al. |
| 5,306,275 A | 4/1994 | Bryan |
| 5,330,503 A | 7/1994 | Yoon |
| 5,334,202 A | 8/1994 | Carter |
| 5,336,223 A | 8/1994 | Rogers |
| 5,356,411 A | 10/1994 | Spievack |
| 5,356,424 A | 10/1994 | Buzerak et al. |
| 5,364,396 A | 11/1994 | Robinson et al. |
| 5,403,322 A | 4/1995 | Herzenberg et al. |
| 5,429,638 A * | 7/1995 | Muschler ............ A61B 17/7216 606/62 |
| 5,437,266 A | 8/1995 | McPherson et al. |
| 5,466,261 A | 11/1995 | Richelsoph |
| 5,468,030 A | 11/1995 | Walling |
| 5,480,437 A | 1/1996 | Draenert |
| 5,509,888 A | 4/1996 | Miller |
| 5,516,335 A | 5/1996 | Kummer et al. |
| 5,527,309 A | 6/1996 | Shelton |
| 5,536,269 A | 7/1996 | Spievack |
| 5,549,610 A | 8/1996 | Russell et al. |
| 5,573,012 A | 11/1996 | McEwan |
| 5,575,790 A | 11/1996 | Chen et al. |
| 5,582,616 A | 12/1996 | Bolduc et al. |
| 5,620,445 A | 4/1997 | Brosnahan et al. |
| 5,620,449 A | 4/1997 | Faccioli et al. |
| 5,626,579 A | 5/1997 | Muschler et al. |
| 5,626,613 A | 5/1997 | Schmieding |
| 5,632,744 A | 5/1997 | Campbell, Jr. |
| 5,659,217 A | 8/1997 | Petersen |
| 5,662,683 A | 9/1997 | Kay |
| 5,672,175 A | 9/1997 | Martin |
| 5,672,177 A | 9/1997 | Seldin |
| 5,700,263 A | 12/1997 | Schendel |
| 5,704,938 A | 1/1998 | Staehlin et al. |
| 5,704,939 A | 1/1998 | Justin |
| 5,720,746 A | 2/1998 | Soubeiran |
| 5,743,910 A | 4/1998 | Bays et al. |
| 5,762,599 A | 6/1998 | Sohn |
| 5,771,903 A | 6/1998 | Jakobsson |
| 5,810,815 A | 9/1998 | Morales |
| 5,827,286 A | 10/1998 | Incavo et al. |
| 5,830,221 A | 11/1998 | Stein et al. |
| 5,879,375 A | 3/1999 | Larson, Jr. et al. |
| 5,902,304 A | 5/1999 | Walker et al. |
| 5,935,127 A | 8/1999 | Border |
| 5,945,762 A | 8/1999 | Chen et al. |
| 5,961,553 A | 10/1999 | Coty et al. |
| 5,976,138 A | 11/1999 | Baumgart et al. |
| 5,979,456 A | 11/1999 | Magovern |
| 6,022,349 A | 2/2000 | McLeod et al. |
| 6,033,412 A | 3/2000 | Losken et al. |
| 6,034,296 A | 3/2000 | Elvin et al. |
| 6,102,922 A | 8/2000 | Jakobsson et al. |
| 6,106,525 A | 8/2000 | Sachse |
| 6,126,660 A | 10/2000 | Dietz |
| 6,126,661 A | 10/2000 | Faccioli et al. |
| 6,138,681 A | 10/2000 | Chen et al. |
| 6,139,316 A | 10/2000 | Sachdeva et al. |
| 6,162,223 A | 12/2000 | Orsak et al. |
| 6,183,476 B1 | 2/2001 | Gerhardt et al. |
| 6,200,317 B1 | 3/2001 | Aalsma et al. |
| 6,234,956 B1 | 5/2001 | He et al. |
| 6,241,730 B1 | 6/2001 | Alby |
| 6,245,075 B1 | 6/2001 | Betz et al. |
| 6,315,784 B1 | 11/2001 | Djurovic |
| 6,319,255 B1 | 11/2001 | Grundei et al. |
| 6,331,744 B1 | 12/2001 | Chen et al. |
| 6,336,929 B1 | 1/2002 | Justin |
| 6,343,568 B1 | 2/2002 | McClasky |
| 6,358,283 B1 | 3/2002 | Hogfors et al. |
| 6,375,682 B1 | 4/2002 | Fleischmann et al. |
| 6,389,187 B1 | 5/2002 | Greenaway et al. |
| 6,400,980 B1 | 6/2002 | Lemelson |
| 6,402,753 B1 | 6/2002 | Cole et al. |
| 6,409,175 B1 | 6/2002 | Evans et al. |
| 6,416,516 B1 | 7/2002 | Stauch et al. |
| 6,499,907 B1 | 12/2002 | Baur |
| 6,500,110 B1 | 12/2002 | Davey et al. |
| 6,508,820 B2 | 1/2003 | Bales |
| 6,510,345 B1 | 1/2003 | Van Bentem |
| 6,537,196 B1 | 3/2003 | Creighton, IV et al. |
| 6,554,831 B1 | 4/2003 | Rivard et al. |
| 6,565,573 B1 | 5/2003 | Ferrante et al. |
| 6,565,576 B1 | 5/2003 | Stauch et al. |
| 6,582,313 B2 | 6/2003 | Perrow |
| 6,583,630 B2 | 6/2003 | Mendes et al. |
| 6,616,669 B2 | 9/2003 | Ogilvie et al. |
| 6,626,917 B1 | 9/2003 | Craig |
| 6,656,135 B2 | 12/2003 | Zogbi et al. |
| 6,656,194 B1 | 12/2003 | Gannoe et al. |
| 6,667,725 B1 | 12/2003 | Simons et al. |
| 6,673,079 B1 | 1/2004 | Kane |
| 6,702,816 B2 | 3/2004 | Buhler |
| 6,706,042 B2 | 3/2004 | Taylor |
| 6,709,293 B2 | 3/2004 | Mori et al. |
| 6,730,087 B1 | 5/2004 | Butsch |
| 6,761,503 B2 | 7/2004 | Breese |
| 6,769,499 B2 | 8/2004 | Cargill et al. |
| 6,789,442 B2 | 9/2004 | Forch |
| 6,796,984 B2 | 9/2004 | Soubeiran |
| 6,802,844 B2 | 10/2004 | Ferree |
| 6,809,434 B1 | 10/2004 | Duncan et al. |
| 6,835,207 B2 | 12/2004 | Zacouto et al. |
| 6,852,113 B2 | 2/2005 | Nathanson et al. |
| 6,918,838 B2 | 7/2005 | Schwarzler et al. |
| 6,918,910 B2 | 7/2005 | Smith et al. |
| 6,921,400 B2 | 7/2005 | Sohngen |
| 6,923,951 B2 | 8/2005 | Contag et al. |
| 6,971,143 B2 | 12/2005 | Domroese |
| 7,001,346 B2 | 2/2006 | White |
| 7,008,425 B2 | 3/2006 | Phillips |
| 7,011,658 B2 | 3/2006 | Young |
| 7,029,472 B1 | 4/2006 | Fortin |
| 7,029,475 B2 | 4/2006 | Panjabi |
| 7,041,105 B2 | 5/2006 | Michelson |
| 7,060,080 B2 | 6/2006 | Bachmann |
| 7,063,706 B2 | 6/2006 | Wittenstein |
| 7,105,029 B2 | 9/2006 | Doubler et al. |
| 7,105,968 B2 | 9/2006 | Nissen |
| 7,114,501 B2 | 10/2006 | Johnson et al. |
| 7,115,129 B2 | 10/2006 | Heggeness |

(56) References Cited

U.S. PATENT DOCUMENTS

| | | |
|---|---|---|
| 7,135,022 B2 | 11/2006 | Kosashvili et al. |
| 7,160,312 B2 | 1/2007 | Saadat |
| 7,163,538 B2 | 1/2007 | Altarac et al. |
| 7,189,005 B2 | 3/2007 | Ward |
| 7,191,007 B2 | 3/2007 | Desai et al. |
| 7,218,232 B2 | 5/2007 | DiSilvestro et al. |
| 7,238,191 B2 | 7/2007 | Bachmann |
| 7,241,300 B2 | 7/2007 | Sharkawy et al. |
| 7,243,719 B2 | 7/2007 | Baron et al. |
| 7,255,682 B1 | 8/2007 | Bartol, Jr. et al. |
| 7,282,023 B2 | 10/2007 | Frering |
| 7,285,087 B2 | 10/2007 | Moaddeb et al. |
| 7,302,015 B2 | 11/2007 | Kim et al. |
| 7,302,858 B2 | 12/2007 | Walsh et al. |
| 7,314,443 B2 | 1/2008 | Jordan et al. |
| 7,333,013 B2 | 2/2008 | Berger |
| 7,357,037 B2 | 4/2008 | Hnat et al. |
| 7,357,635 B2 | 4/2008 | Belfor et al. |
| 7,360,542 B2 | 4/2008 | Nelson et al. |
| 7,390,007 B2 | 6/2008 | Helms et al. |
| 7,390,294 B2 | 6/2008 | Hassler, Jr. |
| 7,402,134 B2 | 7/2008 | Moaddeb et al. |
| 7,402,176 B2 | 7/2008 | Malek |
| 7,429,259 B2 | 9/2008 | Cadeddu et al. |
| 7,445,010 B2 | 11/2008 | Kugler et al. |
| 7,458,981 B2 | 12/2008 | Fielding et al. |
| 7,485,149 B1 | 2/2009 | White |
| 7,489,495 B2 | 2/2009 | Stevenson |
| 7,530,981 B2 | 5/2009 | Kutsenko |
| 7,531,002 B2 | 5/2009 | Sutton et al. |
| 7,553,298 B2 | 6/2009 | Hunt et al. |
| 7,561,916 B2 | 7/2009 | Hunt et al. |
| 7,611,526 B2 | 11/2009 | Carl et al. |
| 7,618,435 B2 | 11/2009 | Opolski |
| 7,658,754 B2 | 2/2010 | Zhang et al. |
| 7,666,184 B2 | 2/2010 | Stauch |
| 7,666,210 B2 | 2/2010 | Franck et al. |
| 7,678,136 B2 | 3/2010 | Doubler et al. |
| 7,678,139 B2 | 3/2010 | Garamszegi et al. |
| 7,708,737 B2 | 5/2010 | Kraft et al. |
| 7,708,762 B2 | 5/2010 | McCarthy et al. |
| 7,727,143 B2 | 6/2010 | Birk et al. |
| 7,753,913 B2 | 7/2010 | Szakelyhidi, Jr. et al. |
| 7,753,915 B1 | 7/2010 | Eksler et al. |
| 7,762,998 B2 | 7/2010 | Birk et al. |
| 7,763,080 B2 | 7/2010 | Southworth |
| 7,766,855 B2 | 8/2010 | Miethke |
| 7,775,215 B2 | 8/2010 | Hassler, Jr. et al. |
| 7,776,068 B2 | 8/2010 | Ainsworth et al. |
| 7,776,075 B2 | 8/2010 | Bruneau et al. |
| 7,787,958 B2 | 8/2010 | Stevenson |
| 7,794,476 B2 | 9/2010 | Wisnewski |
| 7,811,328 B2 | 10/2010 | Molz, IV et al. |
| 7,835,779 B2 | 11/2010 | Anderson et al. |
| 7,837,691 B2 | 11/2010 | Cordes et al. |
| 7,862,586 B2 | 1/2011 | Malek |
| 7,867,235 B2 | 1/2011 | Fell et al. |
| 7,875,033 B2 | 1/2011 | Richter et al. |
| 7,901,381 B2 | 3/2011 | Birk et al. |
| 7,909,852 B2 | 3/2011 | Boomer et al. |
| 7,918,844 B2 | 4/2011 | Byrum et al. |
| 7,938,841 B2 | 5/2011 | Sharkawy et al. |
| 7,985,256 B2 | 7/2011 | Grotz et al. |
| 7,988,709 B2 | 8/2011 | Clark et al. |
| 8,002,809 B2 | 8/2011 | Baynham |
| 8,011,308 B2 | 9/2011 | Picchio |
| 8,034,080 B2 | 10/2011 | Malandain et al. |
| 8,043,299 B2 | 10/2011 | Conway |
| 8,043,338 B2 | 10/2011 | Dant |
| 8,057,473 B2 | 11/2011 | Orsak et al. |
| 8,057,513 B2 | 11/2011 | Kohm et al. |
| 8,083,741 B2 | 12/2011 | Morgan et al. |
| 8,092,499 B1 | 1/2012 | Roth |
| 8,095,317 B2 | 1/2012 | Ekseth et al. |
| 8,105,360 B1 | 1/2012 | Connor |
| 8,114,158 B2 | 2/2012 | Carl et al. |
| 8,123,805 B2 | 2/2012 | Makower et al. |
| 8,133,280 B2 | 3/2012 | Voellmicke et al. |
| 8,147,549 B2 | 4/2012 | Metcalf, Jr. et al. |
| 8,162,897 B2 | 4/2012 | Byrum |
| 8,162,979 B2 | 4/2012 | Sachs et al. |
| 8,177,789 B2 | 5/2012 | Magill et al. |
| 8,197,490 B2 | 6/2012 | Pool et al. |
| 8,211,149 B2 | 7/2012 | Justis |
| 8,211,151 B2 | 7/2012 | Schwab et al. |
| 8,221,420 B2 | 7/2012 | Keller |
| 8,226,690 B2 | 7/2012 | Altarac et al. |
| 8,236,002 B2 | 8/2012 | Fortin et al. |
| 8,241,331 B2 | 8/2012 | Arnin |
| 8,246,630 B2 | 8/2012 | Manzi et al. |
| 8,252,063 B2 | 8/2012 | Stauch |
| 8,267,969 B2 | 9/2012 | Altarac et al. |
| 8,278,941 B2 | 10/2012 | Kroh et al. |
| 8,282,671 B2 | 10/2012 | Connor |
| 8,323,290 B2 | 12/2012 | Metzger et al. |
| 8,357,182 B2 | 1/2013 | Seme |
| 8,366,628 B2 | 2/2013 | Denker et al. |
| 8,372,078 B2 | 2/2013 | Collazo |
| 8,386,018 B2 | 2/2013 | Stauch et al. |
| 8,394,124 B2 | 3/2013 | Biyani |
| 8,403,958 B2 | 3/2013 | Schwab |
| 8,414,584 B2 | 4/2013 | Brigido |
| 8,425,608 B2 | 4/2013 | Dewey et al. |
| 8,435,268 B2 | 5/2013 | Thompson et al. |
| 8,439,926 B2 | 5/2013 | Bojarski et al. |
| 8,444,693 B2 | 5/2013 | Reiley |
| 8,469,908 B2 | 6/2013 | Asfora |
| 8,470,004 B2 | 6/2013 | Reiley |
| 8,486,070 B2 | 7/2013 | Morgan et al. |
| 8,486,076 B2 | 7/2013 | Chavarria et al. |
| 8,486,147 B2 | 7/2013 | De Villiers et al. |
| 8,494,805 B2 | 7/2013 | Roche et al. |
| 8,496,662 B2 | 7/2013 | Novak et al. |
| 8,518,062 B2 | 8/2013 | Cole et al. |
| 8,523,866 B2 | 9/2013 | Sidebotham et al. |
| 8,529,474 B2 | 9/2013 | Gupta et al. |
| 8,529,606 B2 | 9/2013 | Alamin et al. |
| 8,529,607 B2 | 9/2013 | Alamin et al. |
| 8,556,901 B2 | 10/2013 | Anthony et al. |
| 8,556,911 B2 | 10/2013 | Mehta et al. |
| 8,556,975 B2 | 10/2013 | Ciupik et al. |
| 8,562,653 B2 | 10/2013 | Alamin et al. |
| 8,568,457 B2 | 10/2013 | Hunziker |
| 8,579,979 B2 | 11/2013 | Edie et al. |
| 8,585,595 B2 | 11/2013 | Heilman |
| 8,585,740 B1 | 11/2013 | Ross et al. |
| 8,591,549 B2 | 11/2013 | Lange |
| 8,591,553 B2 | 11/2013 | Eisermann et al. |
| 8,613,758 B2 | 12/2013 | Linares |
| 8,617,220 B2 | 12/2013 | Skaggs |
| 8,623,036 B2 | 1/2014 | Harrison et al. |
| 8,632,544 B2 | 1/2014 | Haaja et al. |
| 8,632,548 B2 | 1/2014 | Soubeiran |
| 8,632,563 B2 | 1/2014 | Nagase et al. |
| 8,636,771 B2 | 1/2014 | Butler et al. |
| 8,636,802 B2 | 1/2014 | Serhan et al. |
| 8,641,719 B2 | 2/2014 | Gephart et al. |
| 8,641,723 B2 | 2/2014 | Connor |
| 8,657,856 B2 | 2/2014 | Gephart et al. |
| 8,663,285 B2 | 3/2014 | Dall et al. |
| 8,663,287 B2 | 3/2014 | Butler et al. |
| 8,668,719 B2 | 3/2014 | Alamin et al. |
| 8,709,090 B2 | 4/2014 | Makower et al. |
| 8,758,347 B2 | 6/2014 | Weiner et al. |
| 8,758,355 B2 | 6/2014 | Fisher et al. |
| 8,771,272 B2 | 7/2014 | LeCronier et al. |
| 8,777,947 B2 | 7/2014 | Zahrly et al. |
| 8,777,995 B2 | 7/2014 | McClintock et al. |
| 8,790,343 B2 | 7/2014 | McClellan et al. |
| 8,790,409 B2 | 7/2014 | Van den Heuvel et al. |
| 8,828,058 B2 | 9/2014 | Elsebaie et al. |
| 8,828,087 B2 | 9/2014 | Stone et al. |
| 8,840,651 B2 | 9/2014 | Reiley |
| 8,870,881 B2 | 10/2014 | Rezach et al. |

(56) References Cited

U.S. PATENT DOCUMENTS

| | | |
|---|---|---|
| 8,870,959 B2 | 10/2014 | Arnin |
| 8,915,915 B2 | 12/2014 | Harrison et al. |
| 8,915,917 B2 | 12/2014 | Doherty et al. |
| 8,920,422 B2 | 12/2014 | Homeier et al. |
| 8,945,188 B2 | 2/2015 | Rezach et al. |
| 8,961,521 B2 | 2/2015 | Keefer et al. |
| 8,961,567 B2 | 2/2015 | Hunziker |
| 8,968,402 B2 | 3/2015 | Myers et al. |
| 8,992,527 B2 | 3/2015 | Guichet |
| 9,022,917 B2 | 5/2015 | Kasic et al. |
| 9,044,218 B2 | 6/2015 | Young |
| 9,060,810 B2 | 6/2015 | Kercher et al. |
| 9,078,703 B2 | 7/2015 | Arnin |
| 11,389,111 B2 | 7/2022 | Bae |
| 2002/0050112 A1 | 5/2002 | Koch et al. |
| 2002/0072758 A1 | 6/2002 | Reo et al. |
| 2002/0164905 A1 | 11/2002 | Bryant |
| 2003/0040671 A1 | 2/2003 | Somogyi et al. |
| 2003/0144669 A1 | 7/2003 | Robinson |
| 2003/0220643 A1 | 11/2003 | Ferree |
| 2003/0220644 A1 | 11/2003 | Thelen et al. |
| 2004/0011137 A1 | 1/2004 | Hnat et al. |
| 2004/0011365 A1 | 1/2004 | Govari et al. |
| 2004/0019353 A1 | 1/2004 | Freid et al. |
| 2004/0023623 A1 | 2/2004 | Stauch et al. |
| 2004/0055610 A1 | 3/2004 | Forsell |
| 2004/0133219 A1 | 7/2004 | Forsell |
| 2004/0138725 A1 | 7/2004 | Forsell |
| 2004/0193266 A1 | 9/2004 | Meyer |
| 2005/0034705 A1 | 2/2005 | McClendon |
| 2005/0049617 A1 | 3/2005 | Chatlynne et al. |
| 2005/0065529 A1 | 3/2005 | Liu et al. |
| 2005/0090823 A1 | 4/2005 | Bartimus |
| 2005/0159754 A1 | 7/2005 | Odrich |
| 2005/0234448 A1 | 10/2005 | McCarthy |
| 2005/0234462 A1 | 10/2005 | Hershberger |
| 2005/0246034 A1 | 11/2005 | Soubeiran |
| 2005/0261779 A1 | 11/2005 | Meyer |
| 2005/0272976 A1 | 12/2005 | Tanaka et al. |
| 2006/0004459 A1 | 1/2006 | Hazebrouck et al. |
| 2006/0009767 A1 | 1/2006 | Kiester |
| 2006/0036259 A1 | 2/2006 | Carl et al. |
| 2006/0036323 A1 | 2/2006 | Carl et al. |
| 2006/0036324 A1 | 2/2006 | Sachs et al. |
| 2006/0047282 A1 | 3/2006 | Gordon |
| 2006/0058792 A1 | 3/2006 | Hynes |
| 2006/0069447 A1 | 3/2006 | DiSilvestro et al. |
| 2006/0074448 A1 | 4/2006 | Harrison et al. |
| 2006/0079897 A1 | 4/2006 | Harrison et al. |
| 2006/0136062 A1 | 6/2006 | DiNello et al. |
| 2006/0142767 A1 | 6/2006 | Green et al. |
| 2006/0155279 A1 | 7/2006 | Ogilvie |
| 2006/0195087 A1 | 8/2006 | Sacher et al. |
| 2006/0195088 A1 | 8/2006 | Sacher et al. |
| 2006/0200134 A1 | 9/2006 | Freid et al. |
| 2006/0204156 A1 | 9/2006 | Takehara et al. |
| 2006/0235299 A1 | 10/2006 | Martinelli |
| 2006/0235424 A1 | 10/2006 | Vitale et al. |
| 2006/0241746 A1 | 10/2006 | Shaoulian et al. |
| 2006/0241767 A1 | 10/2006 | Doty |
| 2006/0249914 A1 | 11/2006 | Dulin |
| 2006/0271107 A1 | 11/2006 | Harrison et al. |
| 2006/0282073 A1 | 12/2006 | Simanovsky |
| 2006/0293683 A1 | 12/2006 | Stauch |
| 2007/0010814 A1 | 1/2007 | Stauch |
| 2007/0010887 A1 | 1/2007 | Williams et al. |
| 2007/0021644 A1 | 1/2007 | Woolson et al. |
| 2007/0031131 A1 | 2/2007 | Griffitts |
| 2007/0043376 A1 | 2/2007 | Leatherbury et al. |
| 2007/0050030 A1 | 3/2007 | Kim |
| 2007/0118215 A1 | 5/2007 | Moaddeb |
| 2007/0161984 A1 | 7/2007 | Cresina et al. |
| 2007/0173837 A1 | 7/2007 | Chan et al. |
| 2007/0179493 A1 | 8/2007 | Kim |
| 2007/0185374 A1 | 8/2007 | Kick et al. |
| 2007/0233098 A1 | 10/2007 | Mastrorio et al. |
| 2007/0239159 A1 | 10/2007 | Altarac et al. |
| 2007/0239161 A1 | 10/2007 | Giger et al. |
| 2007/0255088 A1 | 11/2007 | Jacobson et al. |
| 2007/0270803 A1 | 11/2007 | Giger et al. |
| 2007/0276368 A1 | 11/2007 | Trieu et al. |
| 2007/0276369 A1 | 11/2007 | Allard et al. |
| 2007/0276373 A1 | 11/2007 | Malandain |
| 2007/0276378 A1 | 11/2007 | Harrison et al. |
| 2007/0276493 A1 | 11/2007 | Malandain et al. |
| 2007/0288024 A1 | 12/2007 | Gollogly |
| 2007/0288183 A1 | 12/2007 | Bulkes et al. |
| 2008/0009792 A1 | 1/2008 | Henniges et al. |
| 2008/0015577 A1 | 1/2008 | Loeb |
| 2008/0021454 A1 | 1/2008 | Chao et al. |
| 2008/0021455 A1 | 1/2008 | Chao et al. |
| 2008/0021456 A1 | 1/2008 | Gupta et al. |
| 2008/0027436 A1 | 1/2008 | Cournoyer et al. |
| 2008/0033431 A1 | 2/2008 | Jung et al. |
| 2008/0033436 A1 | 2/2008 | Song et al. |
| 2008/0051784 A1 | 2/2008 | Gollogly |
| 2008/0082118 A1 | 4/2008 | Edidin et al. |
| 2008/0086128 A1 | 4/2008 | Lewis |
| 2008/0097487 A1 | 4/2008 | Pool et al. |
| 2008/0097496 A1 | 4/2008 | Chang et al. |
| 2008/0108995 A1 | 5/2008 | Conway et al. |
| 2008/0161933 A1 | 7/2008 | Grotz et al. |
| 2008/0167685 A1 | 7/2008 | Allard et al. |
| 2008/0172063 A1 | 7/2008 | Taylor |
| 2008/0177319 A1 | 7/2008 | Schwab |
| 2008/0177326 A1 | 7/2008 | Thompson |
| 2008/0190237 A1 | 8/2008 | Radinger et al. |
| 2008/0228186 A1 | 9/2008 | Gall et al. |
| 2008/0255615 A1 | 10/2008 | Vittur et al. |
| 2008/0272928 A1 | 11/2008 | Shuster |
| 2008/0275557 A1 | 11/2008 | Makower et al. |
| 2009/0030462 A1 | 1/2009 | Buttermann |
| 2009/0076597 A1 | 3/2009 | Dahlgren et al. |
| 2009/0082815 A1 | 3/2009 | Zylber et al. |
| 2009/0088803 A1 | 4/2009 | Justis et al. |
| 2009/0093820 A1 | 4/2009 | Trieu et al. |
| 2009/0093890 A1 | 4/2009 | Gelbart |
| 2009/0112263 A1 | 4/2009 | Pool et al. |
| 2009/0163780 A1 | 6/2009 | Tieu |
| 2009/0171356 A1 | 7/2009 | Klett |
| 2009/0192514 A1 | 7/2009 | Feinberg et al. |
| 2009/0198144 A1 | 8/2009 | Phillips et al. |
| 2009/0216113 A1 | 8/2009 | Meier et al. |
| 2009/0275984 A1 | 11/2009 | Kim et al. |
| 2010/0004654 A1 | 1/2010 | Schmitz et al. |
| 2010/0057127 A1 | 3/2010 | McGuire et al. |
| 2010/0094306 A1 | 4/2010 | Chang et al. |
| 2010/0100185 A1 | 4/2010 | Trieu et al. |
| 2010/0106192 A1 | 4/2010 | Barry |
| 2010/0114322 A1 | 5/2010 | Clifford et al. |
| 2010/0130941 A1 | 5/2010 | Conlon et al. |
| 2010/0137872 A1 | 6/2010 | Kam et al. |
| 2010/0145449 A1 | 6/2010 | Makower et al. |
| 2010/0145462 A1 | 6/2010 | Ainsworth et al. |
| 2010/0168751 A1 | 7/2010 | Anderson et al. |
| 2010/0249782 A1 | 9/2010 | Durham |
| 2010/0256626 A1 | 10/2010 | Muller et al. |
| 2010/0262239 A1 | 10/2010 | Boyden et al. |
| 2010/0318129 A1 | 12/2010 | Seme et al. |
| 2010/0331883 A1 | 12/2010 | Schmitz et al. |
| 2011/0004076 A1 | 1/2011 | Janna et al. |
| 2011/0057756 A1 | 3/2011 | Marinescu et al. |
| 2011/0066188 A1 | 3/2011 | Seme et al. |
| 2011/0098748 A1 | 4/2011 | Jangra |
| 2011/0152725 A1 | 6/2011 | Demir et al. |
| 2011/0196435 A1 | 8/2011 | Forsell |
| 2011/0202138 A1 | 8/2011 | Shenoy et al. |
| 2011/0238126 A1 | 9/2011 | Soubeiran |
| 2011/0257655 A1 | 10/2011 | Copf, Jr. |
| 2011/0284014 A1 | 11/2011 | Cadeddu et al. |
| 2012/0019341 A1 | 1/2012 | Gabay et al. |
| 2012/0019342 A1 | 1/2012 | Gabay et al. |
| 2012/0053633 A1 | 3/2012 | Stauch |
| 2012/0088953 A1 | 4/2012 | King |

(56) References Cited

U.S. PATENT DOCUMENTS

| | | |
|---|---|---|
| 2012/0109207 A1 | 5/2012 | Trieu |
| 2012/0116535 A1 | 5/2012 | Ratron et al. |
| 2012/0158061 A1 | 6/2012 | Koch et al. |
| 2012/0172883 A1 | 7/2012 | Sayago |
| 2012/0179215 A1 | 7/2012 | Soubeiran |
| 2012/0221106 A1 | 8/2012 | Makower et al. |
| 2012/0271353 A1 | 10/2012 | Barry |
| 2012/0296234 A1 | 11/2012 | Wilhelm et al. |
| 2012/0329882 A1 | 12/2012 | Messersmith et al. |
| 2013/0013066 A1 | 1/2013 | Landry et al. |
| 2013/0072932 A1 | 3/2013 | Stauch |
| 2013/0123847 A1 | 5/2013 | Anderson et al. |
| 2013/0138017 A1 | 5/2013 | Jundt et al. |
| 2013/0138154 A1 | 5/2013 | Reiley |
| 2013/0150863 A1 | 6/2013 | Baumgartner |
| 2013/0150889 A1 | 6/2013 | Fening et al. |
| 2013/0178903 A1 | 7/2013 | Abdou |
| 2013/0211521 A1 | 8/2013 | Shenoy et al. |
| 2013/0245692 A1 | 9/2013 | Hayes et al. |
| 2013/0253344 A1 | 9/2013 | Griswold et al. |
| 2013/0253587 A1 | 9/2013 | Carls et al. |
| 2013/0261672 A1 | 10/2013 | Horvath |
| 2013/0296863 A1 | 11/2013 | Globerman et al. |
| 2013/0296864 A1 | 11/2013 | Burley et al. |
| 2013/0296940 A1 | 11/2013 | Northcutt et al. |
| 2013/0325006 A1 | 12/2013 | Michelinie et al. |
| 2013/0325071 A1 | 12/2013 | Niemiec et al. |
| 2014/0005788 A1 | 1/2014 | Haaja et al. |
| 2014/0025172 A1 | 1/2014 | Lucas et al. |
| 2014/0052134 A1 | 2/2014 | Orisek |
| 2014/0058392 A1 | 2/2014 | Mueckter et al. |
| 2014/0058450 A1 | 2/2014 | Arlet |
| 2014/0066987 A1 | 3/2014 | Hestad et al. |
| 2014/0088715 A1 | 3/2014 | Ciupik |
| 2014/0128920 A1 | 5/2014 | Kantelhardt |
| 2014/0163664 A1 | 6/2014 | Goldsmith |
| 2014/0236234 A1 | 8/2014 | Kroll et al. |
| 2014/0236311 A1 | 8/2014 | Vicatos et al. |
| 2014/0257412 A1 | 9/2014 | Patty et al. |
| 2014/0277446 A1 | 9/2014 | Clifford et al. |
| 2014/0296918 A1 | 10/2014 | Fening et al. |
| 2014/0303538 A1 | 10/2014 | Baym et al. |
| 2014/0303539 A1 | 10/2014 | Baym et al. |
| 2014/0358150 A1 | 12/2014 | Kaufman et al. |
| 2015/0105782 A1 | 4/2015 | D'Lima et al. |
| 2015/0105824 A1 | 4/2015 | Moskowitz et al. |
| 2018/0296256 A1* | 10/2018 | Beckett .............. A61B 17/7233 |
| 2019/0015138 A1* | 1/2019 | Schwardt ........... A61B 17/7216 |
| 2022/0015811 A1 | 1/2022 | Lopez Camacho et al. |
| 2023/0041121 A1 | 2/2023 | Lopez Camacho et al. |

FOREIGN PATENT DOCUMENTS

| | | | |
|---|---|---|---|
| DE | 1541262 A1 | 6/1969 | |
| DE | 8515687 U1 | 12/1985 | |
| DE | 19626230 A1 | 1/1998 | |
| DE | 19745654 A1 | 4/1999 | |
| DE | 102005045070 A1 | 4/2007 | |
| EP | 0663184 A1 | 7/1995 | |
| EP | 1905388 A1 | 4/2008 | |
| FR | 2901991 A1 | 12/2007 | |
| FR | 2900563 B1 | 8/2008 | |
| FR | 2892617 B1 | 9/2008 | |
| FR | 2916622 B1 | 9/2009 | |
| FR | 2961386 B1 | 12/2011 | |
| JP | H0956736 | 3/1997 | |
| JP | 2002500063 A | 1/2002 | |
| WO | WO1998044858 A1 | 10/1998 | |
| WO | WO1999051160 A1 | 10/1999 | |
| WO | WO2001024697 A1 | 4/2001 | |
| WO | WO2001045485 A3 | 6/2001 | |
| WO | WO2001045487 A2 | 6/2001 | |
| WO | WO2001067973 A2 | 9/2001 | |
| WO | WO2001078614 A1 | 10/2001 | |
| WO | WO2007013059 A3 | 2/2007 | |
| WO | WO2007015239 A3 | 2/2007 | |
| WO | WO2011116158 A3 | 9/2011 | |
| WO | WO2013119528 A1 | 8/2013 | |
| WO | WO2014040013 A1 | 3/2014 | |
| WO | 2022/249101 A2 | 12/2022 | |

OTHER PUBLICATIONS

Ahlbom et al., "Guidelines for limiting exposure to time-varying electric, magnetic, and electromagnetic fields (up to 300 GHz). International Commission on Non-Ionizing Radiation Protection.", Health Physics, 1998, pp. 494-522, 74, No. 4.

Amer et al., "Evaluation of treatment of late-onset tibia vara using gradual angulation translation high tibial osteotomy", ACTA Orthopaedica Belgica, 2010, pp. 360-366, 76, No. 3.

Angrisani et al., "Lap-Band® Rapid Port™ System: Preliminary results in 21 patients", Obesity Surgery, 2005, p. 936, 15, No. 7.

Baumgart et al., "A fully implantable, programmable distraction nail (Fitbone)—new perspectives for corrective and reconstructive limb surgery.", Practice of Intramedullary Locked Nails, 2006, pp. 189-198.

Baumgart et al., "The bioexpandable prosthesis: A new perspective after resection of malignant bone tumors in children.", J Pediatr Hematol Oncol, 2005, pp. 452-455, 27, No. 8.

Bodó et al., "Development of a tension-adjustable implant for anterior cruciate ligament reconstruction.", Eklem Hastaliklari ve Cerrahisi—Joint Diseases and Related Surgery, 2008, pp. 27-32, 19, No. 1.

Boudjemline et al., "Off-label use of an adjustable gastric banding system for pulmonary artery banding.", The Journal of Thoracic and Cardiovascular Surgery, 2006, pp. 1130-1135, 131, No. 5.

Brown et al., "Single port surgery and the Dundee Endocone.", SAGES Annual Scientific Sessions: Emerging Technology Poster Abstracts, 2007, ETP007, pp. 323-324.

Buchowski et al., "Temporary internal distraction as an aid to correction of severe scoliosis", J Bone Joint Surg Am, 2006, pp. 2035-2041, 88-A, No. 9.

Burghardt et al., "Mechanical failure of the Intramedullary Skeletal Kinetic Distractor in limb lengthening.", J Bone Joint Surg Br, 2011, pp. 639-643, 93-B, No. 5.

Burke, "Design of a minimally invasive non fusion device for the surgical management of scoliosis in the skeletally immature", Studies in Health Technology and Informatics, 2006, pp. 378-384, 123.

Carter et al., "A cumulative damage model for bone fracture.", Journal of Orthopaedic Research, 1985, pp. 84-90, 3, No. 1.

Chapman et al., "Laparoscopic adjustable gastric banding in the treatment of obesity: A systematic literature review.", Surgery, 2004, pp. 326-351, 135, No. 3.

Cole et al., "Operative technique intramedullary skeletal kinetic distractor: Tibial surgical technique.", Orthofix, 2005.

Cole et al., "The intramedullary skeletal kinetic distractor (ISKD): first clinical results of a new intramedullary nail for lengthening of the femur and tibia.", Injury, 2001, pp. S-D-129-S-D-139, 32.

Dailey et al., "A novel intramedullary nail for micromotion stimulation of tibial fractures.", Clinical Biomechanics, 2012, pp. 182-188, 27, No. 2.

Daniels et al., "A new method for continuous intraoperative measurement of Harrington rod loading patterns.", Annals of Biomedical Engineering, 1984, pp. 233-246, 12, No. 3.

De Giorgi et al., "Cotrel-Dubousset instrumentation for the treatment of severe scoliosis.", European Spine Journal, 1999, pp. 8-15, No. 1.

Dorsey et al., "The stability of three commercially available implants used in medial opening wedge high tibial osteotomy.", Journal of Knee Surgery, 2006, pp. 95-98, 19, No. 2.

Edeland et al., "Instrumentation for distraction by limited surgery in scoliosis treatment.", Journal of Biomedical Engineering, 1981, pp. 143-146, 3, No. 2.

Elsebaie, "Single growing rods (Review of 21 cases). Changing the foundations: Does it affect the results?", Journal of Child Orthop, 2007, 1:258.

(56) References Cited

OTHER PUBLICATIONS

Ember et al., "Distraction forces required during growth rod lengthening.", J of Bone Joint Surg BR, 2006, p. 229, 88-B, No. Suppl. II.
European Patent Office, "Observations by a third party under Article 115 EPC in EP08805612 by Soubeiran.", 2010.
Fabry et al., "A technique for prevention of port complications after laparoscopic adjustable silicone gastric banding.", Obesity Surgery, 2002, pp. 285-288, 12, No. 2.
Fried et al., "In vivo measurements of different gastric band pressures towards the gastric wall at the stoma region.", Obesity Surgery, 2004, p. 914, 14, No. 7.
Gao et al., CHD7 gene polymorphisms are associated with susceptibility to idiopathic scoliosis, American Journal of Human Genetics, 2007, pp. 957-965, 80.
Gebhart et al., "Early clinical experience with a custom made growing endoprosthesis in children with malignant bone tumors of the lower extremity actioned by an external permanent magnet; The Phenix M. system", International Society of Limb Salvage 14th International Symposium on Limb Salvage. Sep. 3, 2007, Hamburg, Germany. (2 pages).
Gillespie et al. "Harrington instrumentation without fusion.", J Bone Joint Surg Br, 1981, p. 461, 63-B, No. 3.
Goodship et al., "Strain rate and timing of stimulation in mechanical modulation of fracture healing.", Clinical Orthopaedics and Related Research, 1998, pp. S105-S115, No. 355S.
Grass et al., "Intermittent distracting rod for correction of high neurologic risk congenital scoliosis.", SPINE, 1997, pp. 1922-1927, 22, No. 16.
Gray, "Gray's anatomy of the human body.", http://education.yahoo.com/reference/gray/subjects/subject/128, published Jul. 1, 2007.
Grimer et al. "Non-invasive extendable endoprostheses for children—Expensive but worth it!", International Society of Limb Salvage 14th International Symposium on Limb Salvage, 2007.
Grünert, "The development of a totally implantable electronic sphincter." (translated from the German "Die Entwicklung eines total implantierbaren elektronischen Sphincters"), Langenbecks Archiv fur Chirurgie, 1969, pp. 1170-1174, 325.
Guichet et al. "Gradual femoral lengthening with the Albizzia intramedullary nail", J Bone Joint Surg Am, 2003, pp. 838-848, 85-A, No. 5.
Gupta et al., "Non-invasive distal femoral expandable endoprosthesis for limb-salvage surgery in paediatric tumours.", J Bone Joint Surg Br, 2006, pp. 649-654, 88-B, No. 5.
Hankemeier et al., "Limb lengthening with the Intramedullary Skeletal Kinetic Distractor (ISKD).", Oper Orthop Traumatol, 2005, pp. 79-101, 17, No. 1.
Harrington, "Treatment of scoliosis. Correction and internal fixation by spine instrumentation.", J Bone Joint Surg Am, 1962, pp. 591-610, 44-A, No. 4.
Hennig et al., "The safety and efficacy of a new adjustable plate used for proximal tibial opening wedge osteotomy in the treatment of unicompartmental knee osteoarthrosis.", Journal of Knee Surgery, 2007, pp. 6-14, 20, No. 1.
Hofmeister et al., "Callus distraction with the Albizzia nail.", Practice of Intramedullary Locked Nails, 2006, pp. 211-215.
Horbach et al., "First experiences with the routine use of the Rapid Port™ system with the Lap-Band®.", Obesity Surgery, 2006, p. 418, 16, No. 4.
Hyodo et al., "Bone transport using intramedullary fixation and a single flexible traction cable.", Clinical Orthopaedics and Related Research, 1996, pp. 256-268, 325.
International Commission on Non-Ionizing Radiation Protection, "Guidelines on limits of exposure to static magnetic fields." Health Physics, 2009, pp. 504-514, 96, No. 4.
INVIS®/Lamello Catalog, 2006, Article No. 68906A001 GB.
Kasliwal et al., "Management of high-grade spondylolisthesis.", Neurosurgery Clinics of North America, 2013, pp. 275-291, 24, No. 2.
Kenawey et al., "Leg lengthening using intramedullay skeletal kinetic distractor: Results of 57 consecutive applications.", Injury, 2011, pp. 150-155, 42, No. 2.
Kent et al., "Assessment and correction of femoral malrotation following intramedullary nailing of the femur.", Acta Orthop Belg, 2010, pp. 580-584, 76, No. 5.
Klemme et al., "Spinal instrumentation without fusion for progressive scoliosis in young children", Journal of Pediatric Orthopaedics. 1997, pp. 734-742, 17, No. 6.
Korenkov et al., "Port function after laparoscopic adjustable gastric banding for morbid obesity.", Surgical Endoscopy, 2003, pp. 1068-1071, 17, No. 7.
Krieg et al., "Leg lengthening with a motorized nail in adolescents.", Clinical Orthopaedics and Related Research, 2008, pp. 189-197, 466, No. 1.
Kucukkaya et al., "The new intramedullary cable bone transport technique.", Journal of Orthopaedic Trauma, 2009, pp. 531-536, 23, No. 7.
Lechner et al., "In vivo band manometry: A new method in band adjustment", Obesity Surgery, 2005, p. 935, 15, No. 7.
Lechner et al., "Intra-band manometry for band adjustments: The basics", Obesity Surgery, 2006, pp. 417-418, 16, No. 4.
Li et al., "Bone transport over an intramedullary nail: A case report with histologic examination of the regenerated segment.", Injury, 1999, pp. 525-534, 30, No. 8.
Lonner, "Emerging minimally invasive technologies for the management of scoliosis.", Orthopedic Clinics of North America, 2007, pp. 431-440, 38, No. 3.
Matthews et al., "Magnetically adjustable intraocular lens.", Journal of Cataract and Refractive Surgery, 2003, pp. 2211-2216, 29, No. 11.
Micromotion, "Micro Drive Engineering. General catalogue.", 2009, pp. 14-24.
Mineiro et al., "Subcutaneous rodding for progressive spinal curvatures: Early results.", Journal of Pediatric Orthopaedics, 2002, pp. 290-295, 22, No. 3.
Moe et al., "Harrington instrumentation without fusion plus external orthotic support for the treatment of difficult curvature problems in young children.", Clinical Orthopaedics and Related Research, 1984, pp. 35-45, 185.
Montague et al., "Magnetic gear dynamics for servo control.", Melecon 2010—2010 15th IEEE Mediterranean Electrotechnical Conference, Valletta, 2010, pp. 1192-1197.
Montague et al., "Servo control of magnetic gears.", IEEE/ASME Transactions on Mechatronics, 2012, pp. 269-278, 17, No. 2.
Nachemson et al., "Intravital wireless telemetry of axial forces in Harrington distraction rods in patients with idiopathic scoliosis.", The Journal of Bone and Joint Surgery, 1971, pp. 445-465, 53, No. 3.
Nachlas et al., "The cure of experimental scoliosis by directed growth control.", The Journal of Bone and Joint Surgery, 1951, pp. 24-34, 33-A, No. 1.
Newton et al., "Fusionless scoliosis correction by anterolateral tethering . . . can it work?. ", 39th Annual Scoliosis Research Society Meeting, 2004.
Oh et al., "Bone transport over an intramedullary nail for reconstruction of long bone defects in tibia.", Archives of Orthopaedic and Trauma Surgery, 2008, pp. 801-808, 128, No. 8.
Ozcivici et al., "Mechanical signals as anabolic agents in bone.", Nature Reviews Rheumatology, 2010, pp. 50-59, 6, No. 1.
Piorkowski et al., Preventing Port Site Inversion in Laparoscopic Adjustable Gastric Banding, Surgery for Obesity and Related Diseases, 2007, 3(2), pp. 159-162, Elsevier; New York, U.S.A.
Prontes, "Longest bone in body.", eHow.com, 2012.
Rathjen et al., "Clinical and radiographic results after implant removal in idiopathic scoliosis.", SPINE, 2007, pp. 2184-2188, 32, No. 20.
Ren et al., "Laparoscopic adjustable gastric banding: Surgical technique", Journal of Laparoendoscopic & Advanced Surgical Techniques, 2003, pp. 257-263, 13, No. 4.
Reyes-Sanchez et al., "External fixation for dynamic correction of severe scoliosis", The Spine Journal, 2005, pp. 418-426, 5, No. 4.

(56) References Cited

OTHER PUBLICATIONS

Rinsky et al., "Segmental instrumentation without fusion in children with progressive scoliosis.", Journal of Pediatric Orthopedics, 1985, pp. 687-690, 5, No. 6.
Rode et al., "A simple way to adjust bands under radiologic control", Obesity Surgery, 2006, p. 418, 16, No. 4.
Schmerling et al., "Using the shape recovery of nitinol in the Harrington rod treatment of scoliosis.", Journal of Biomedical Materials Research, 1976, pp. 879-892, 10, No. 6.
Scott et al., "Transgastric, transcolonic and transvaginal cholecystectomy using magnetically anchored instruments.", SAGES Annual Scientific Sessions, Poster Abstracts, Apr. 18-22, 2007, p. 511, p. 306.
Sharke, "The machinery of life", Mechanical Engineering Magazine, Feb. 2004, Printed from Internet site Oct. 24, 2007 http://www.memagazine.org/contents/current/features/moflife/moflife.html.
Shiha et al., "Ilizarov gradual correction of genu varum deformity in adults.", Acta Orthop Belg, 2009, pp. 784-791, 75, No. 6.
Simpson et al., "Femoral lengthening with the intramedullary skeletal kinetic distractor.", Journal of Bone and Joint Surgery, 2009, pp. 955-961, 91-B, No. 7.
Smith, "The use of growth-sparing instrumentation in pediatric spinal deformity.", Orthopedic Clinics of North America, 2007, pp. 547-552, 38, No. 4.
Soubeiran et al. "The Phenix M System, a fully implanted non-invasive lengthening device externally controllable through the skin with a palm size permanent magnet. Applications in limb salvage." International Society of Limb Salvage 14th International Symposium on Limb Salvage, Sep. 13, 2007, Hamburg, Germany. (2 pages).
Soubeiran et al., "The Phenix M System. A fully implanted lengthening device externally controllable through the skin with a palm size permanent magnet; Applications to pediatric orthopaedics", 6th European Research Conference in Pediatric Orthopaedics, Oct. 6, 2006, Toulouse, France (7 pages).
Stokes et al., "Reducing radiation exposure in early-onset scoliosis surgery patients: Novel use of ultrasonography to measure lengthening in magnetically-controlled growing rods. Prospective validation study and assessment of clinical algorithm", 20th International Meeting on Advanced Spine Techniques, Jul. 11, 2013. Vancouver, Canada. Scoliosis Research Society.
Sun et al., "Masticatory mechanics of a mandibular distraction osteogenesis site: Interfragmentary micromovement.", Bone, 2007, pp. 188-196, 41, No. 2.
Synthes Spine, "VEPTR II. Vertical Expandable Prosthetic Titanium Rib II: Technique Guide.", 2008, 40 pgs.
Synthes Spine, "VEPTR Vertical Expandable Prosthetic Titanium Rib, Patient Guide.", 2005, 26 pgs.
Takaso et al., "New remote-controlled growing-rod spinal instrumentation possibly applicable for scoliosis in young children.", Journal of Orthopaedic Science, 1998, pp. 336-340, 3, No. 6.
Teli et al., "Measurement of forces generated during distraction of growing rods.", Journal of Children's Orthopaedics, 2007, pp. 257-258, 1, No. 4.
Tello, "Harrington instrumentation without arthrodesis and consecutive distraction program for young children with severe spinal deformities: Experience and technical details.", The Orthopedic Clinics of North America, 1994, pp. 333-351, 25, No. 2.
Thaller et al., "Limb lengthening with fully implantable magnetically actuated mechanical nails (PHENIX®)—Preliminary results.", Injury, 2014 (E-published Oct. 28, 2013), pp. S60-S65, 45.
Thompson et al., "Early onset scoliosis: Future directions", 2007, J Bone Joint Surg Am, pp. 163-166, 89-A, Suppl 1.
Thompson et al., "Growing rod techniques in early-onset scoliosis", Journal of Pediatric Orthopedics, 2007, pp. 354-361, 27, No. 3.
Thonse et al., "Limb lengthening with a fully implantable, telescopic, intramedullary nail.", Operative Techniques in Orthopedics, 2005, pp. 355-362, 15, No. 4.
Trias et al., "Dynamic loads experienced in correction of idiopathic scoliosis using two types of Harrington rods.", SPINE, 1979, pp. 228-235, 4, No. 3.
Verkerke et al., "An extendable modular endoprosthetic system for bone tumor management in the leg", Journal of Biomedical Engineering, 1990, pp. 91-96, 12, No. 2.
Verkerke et al., "Design of a lengthening element for a modular femur endoprosthetic system", Proceedings of the Institution of Mechanical Engineers Part H: Journal of Engineering in Medicine, 1989, pp. 97-102, 203, No. 2.
Verkerke et al., "Development and test of an extendable endoprosthesis for bone reconstruction in the leg.", The International Journal of Artificial Organs, 1994, pp. 155-162, 17, No. 3.
Weiner et al., "Initial clinical experience with telemetrically adjustable gastric banding", Surgical Technology International, 2005, pp. 63-69, 15.
Wenger, "Spine jack operation in the correction of scoliotic deformity: A direct intrathoracic attack to straighten the laterally bent spine: Preliminary report", Arch Surg, 1961, pp. 123-132 (901-910), 83, No. 6.
White, III et al., "The clinical biomechanics of scoliosis.", Clinical Orthopaedics and Related Research, 1976, pp. 100-112, 118.
Yonnet, "A new type of permanent magnet coupling.", IEEE Transactions on Magnetics, 1981, pp. 2991-2993, 17, No. 6.
Yonnet, "Passive magnetic bearings with permanent magnets.", IEEE Transactions on Magnetics, 1978, pp. 803-805, 14, No. 5.
Zheng et al., "Force and torque characteristics for magnetically driven blood pump.", Journal of Magnetism and Magnetic Materials, 2002, pp. 292-302, 241, No. 2.

\* cited by examiner

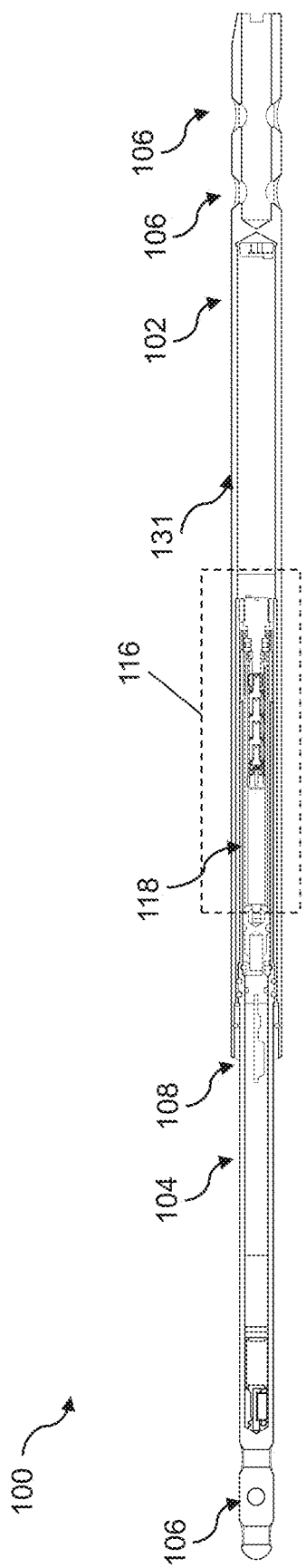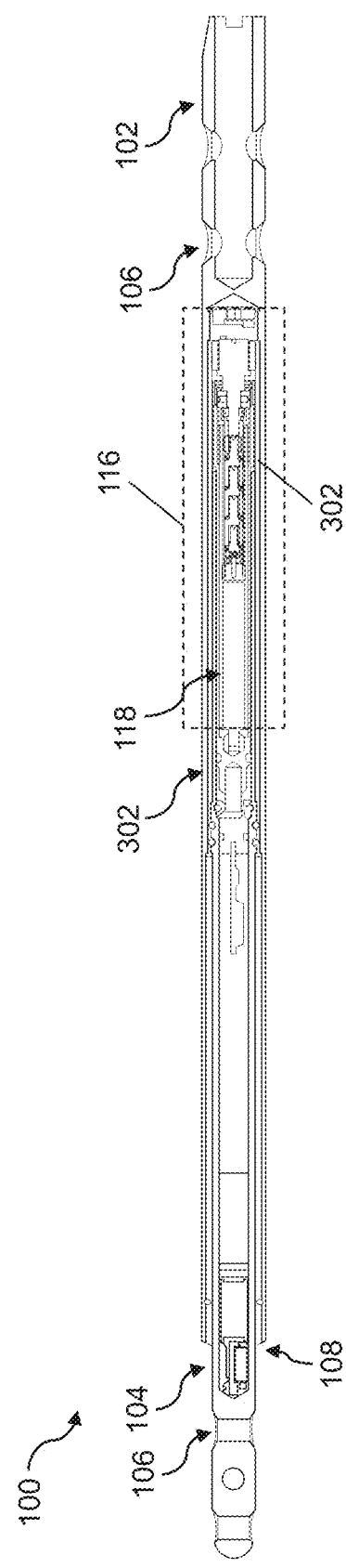

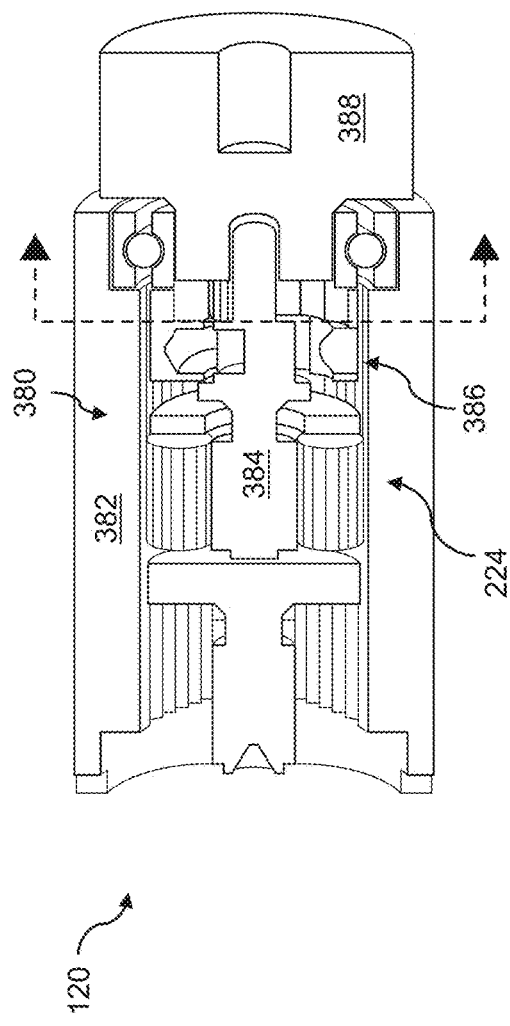
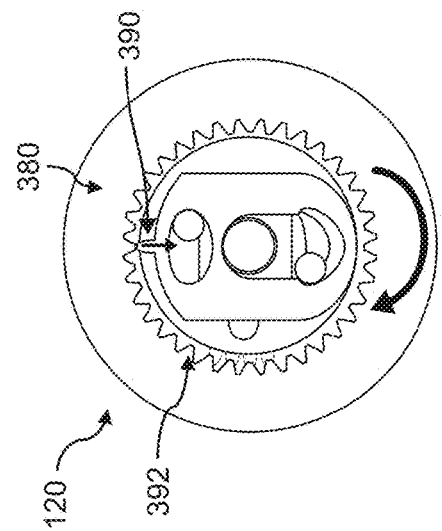
FIG. 9
FIG. 10
FIG. 11

ADJUSTABLE IMPLANT

TECHNICAL FIELD

The subject matter described herein relates to adjustable implants, including intramedullary distraction and compression devices and/or adjustable spinal rods.

BACKGROUND

Distraction osteogenesis is a technique which has been used to grow new bone in patients with a variety of defects. For example, limb lengthening is a technique in which the length of a bone, for example a femur or tibia, may be increased. By creating a corticotomy or osteotomy in the bone, which is a cut through the bone, the two resulting sections of bone may be moved apart at a particular rate, such as one (1.0) mm per day, allowing new bone to regenerate between the two sections as they move apart. This technique of limb lengthening may be used in cases where one limb is longer than the other, such as in a patient whose prior bone break did not heal correctly, or in a patient whose growth plate was diseased or damaged prior to maturity. In some patients, stature lengthening is desired, and is achieved by lengthening both femurs and/or both tibias to increase the patient's height.

Limb lengthening is often performed using external fixation, wherein an external distraction frame is attached to the two sections of bone by pins which pass through the skin. The pins can be sites for infection and are often painful for the patient, as the pin placement site or "pin tract" remains a somewhat open wound throughout the treatment process. The external fixation frames are also bulky, making it difficult for patient to comfortably sit, sleep, and move. Intramedullary adjustable implants such as lengthening devices also exist, such as those described in U.S. Patent Application Publication No. 2011/0060336, which is incorporated by reference herein.

However, certain conventional intramedullary adjustable implants can be bulky, making them impractical for smaller bones. Further, it can be difficult to precisely determine the load on certain conventional intramedullary adjustable implants, e.g., through indirect load measurement on pins. Even further, certain conventional intramedullary adjustable implants can suffer from communication-based issues such as signal interference from the implant components.

SUMMARY

All examples and features mentioned below can be combined in any technically possible way.

A first aspect of the disclosure provides an adjustable implant including: a housing having an internal thread and defining a cavity within the housing; an adjustable member at least partially positioned within the housing and moveable relative to the housing within the cavity; an actuation assembly positioned within the adjustable member and configured to move the adjustable member relative to the housing, the actuation assembly including: an actuator configured to be activated by an external adjustment device; a gear assembly coupled to the actuator; and an output driver coupled to the gear assembly; and a sleeve positioned radially between the actuation assembly and the adjustable member, the sleeve configured to move independently of the adjustable member to enable measurement of a load on the adjustable implant.

A second aspect of the disclosure provides an adjustable implant including: a housing having an internal thread and defining a cavity within the housing; an adjustable member at least partially positioned within the housing and moveable relative to the housing within the cavity, the adjustable member including a transducer adjacent an outer wall thereof; an actuation assembly positioned within the adjustable member and configured to move the adjustable member relative to the housing, the actuation assembly including: an actuator configured to be activated by an external adjustment device; a gear assembly coupled to the actuator; and an output driver coupled to the gear assembly; and a sleeve located radially between the actuation assembly and the adjustable member, the sleeve including a load cell coupled with the transducer.

In certain implementations, the sleeve surrounds the actuation assembly.

In certain implementations, the sleeve includes a load cell contained in the adjustable member.

In certain implementations, the load cell is coupled with an end of the actuation assembly.

In certain implementations, the load cell permits measurement of the load on the adjustable implant from inside the adjustable implant.

In certain implementations, the load cell permits measurement of the load on the adjustable implant without a direct measurement of load on a bone anchor coupling the adjustable implant with a bone of a patient.

In certain implementations, the load cell permits measurement of both a compressive load and a tensile load on the adjustable implant.

In certain implementations, the implant further includes a strain gage connected with the load cell by a set of interconnects.

In certain implementations, the strain gage includes a circuit for calculating a load value from detected strain.

In certain implementations, the strain gauge is coupled with a transducer for transmitting load value data from the adjustable implant.

In certain implementations, the implant further includes an alignment pin coupling the strain gauge with the load cell.

In certain implementations, the adjustable member includes a shoulder engaged with the alignment pin.

In certain implementations, the implant further includes a retainer coupling the load cell with the adjustable member.

In certain implementations, the implant further includes an anti-rotation lug at least partially surrounding the adjustable member for limiting rotation of the adjustable member with respect to the housing.

In certain implementations, the housing includes a set of threads having distinct thread pitches to control a distraction rate of the actuation assembly.

In certain implementations, the actuator includes a magnetic actuator.

In certain implementations, the implant further includes a locking mechanism coupled with the gear assembly for controlling distraction loss of the actuation assembly.

In certain implementations, the actuator includes a motor with an integrated distraction loss mechanism.

In certain implementations, the sleeve includes an anti-rotation mechanism that enables the sleeve to move axially independently of the adjustable member without substantial rotation about a distraction axis.

In certain implementations, the implant further includes an anti-jam member in the cavity.

In certain implementations, the gear assembly includes a ring gear comprising an anti-rotation feature.

In certain implementations, the gear assembly includes a four-stage gear assembly.

In certain implementations, the implant further includes a battery slot in the adjustable member and a battery in the battery slot.

In certain implementations, the implant further includes a transducer connected with the battery in the adjustable member.

In certain implementations, the transducer is positioned such that the housing does not obstruct signal transmission to or from the transducer while the adjustable implant is in a fully retracted state.

In certain implementations, the transducer includes an ultrasound transducer.

In certain implementations, the ultrasound transducer includes a piezoelectric transducer.

In certain implementations, the piezoelectric transducer is partially arcuate to enable directional control of ultrasonic signals.

In certain implementations, the partially arcuate piezoelectric transducer has a tuned signal strength in at least one direction.

In certain implementations, the piezoelectric transducer abuts an outer wall of the adjustable member.

In certain implementations, the piezoelectric transducer is bonded directly to an inner surface of the outer wall of the adjustable member without an air gap therebetween, or the piezoelectric transducer is bonded to the inner surface of the outer wall of the adjustable member with a titanium sleeve therebetween.

In certain implementations, a method includes: positioning the piezoelectric transducer in the adjustable member.

In certain implementations, the method further includes bonding the piezoelectric transducer to an inner surface of an outer wall of the adjustable member.

In certain implementations, a method includes measuring the load on the adjustable implant.

In certain implementations, the method further includes actuating the actuator to adjust the adjustable implant based on the measured load.

In certain implementations, the transducer is configured to transmit signals about a load on the adjustable implant detected by the load cell.

In certain implementations, the sleeve is configured to move independently of the adjustable member to enable measurement of a load on the adjustable implant.

In certain implementations, the implant further includes a battery slot in the adjustable member and a battery in the battery slot.

In certain implementations, the transducer is connected with the battery.

In certain implementations, the transducer is positioned such that the housing does not obstruct signal transmission to or from the transducer while the adjustable implant is in a fully retracted state.

In certain implementations, a method includes: positioning the piezoelectric transducer in the adjustable member.

In certain implementations, the method further includes bonding the piezoelectric transducer to an inner surface of an outer wall of the adjustable member.

In certain implementations, the method further includes measuring the load on the adjustable implant.

In certain implementations, the method further includes actuating the actuator to adjust the adjustable implant based on the measured load.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 is a cross-sectional view of an adjustable implant in an extended position according to embodiments of the disclosure;

FIG. 2 shows the adjustable implant of FIG. 1 in a retracted position;

FIGS. 9-11 illustrate features of a distraction loss mechanism in an adjustable implant according to embodiments of the disclosure;

Figure 3:
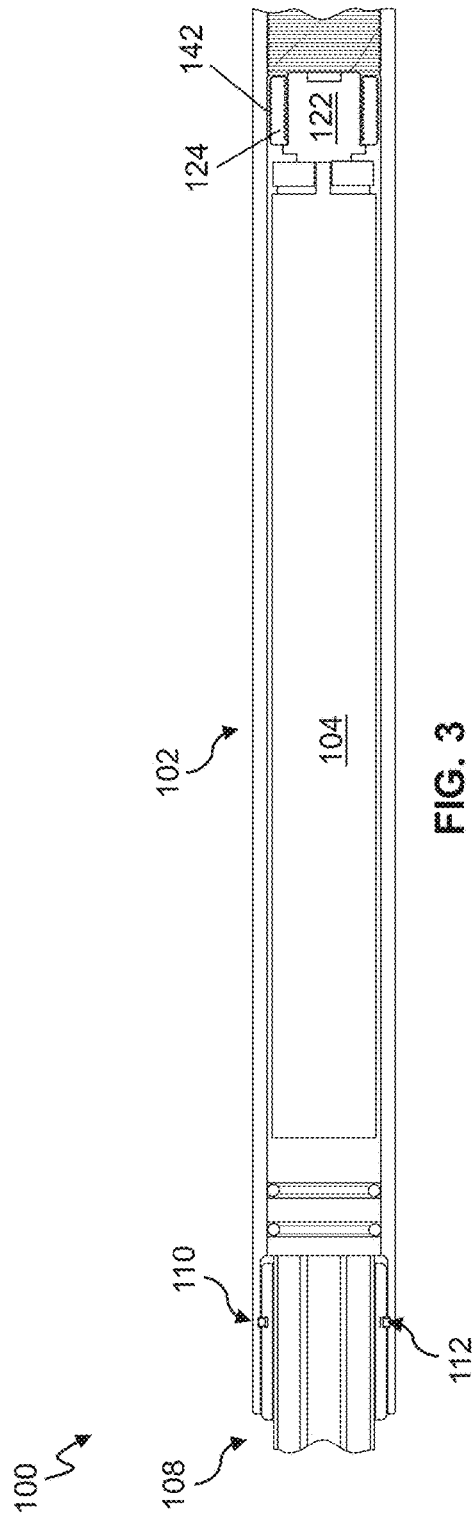
FIG. 3 is a partial sectional view of a portion of an adjustable implant according to embodiments of the disclosure.

It is noted that the drawings of the subject matter are not necessarily to scale. The drawings are intended to depict only typical aspects of the subject matter, and therefore, should not be considered as limiting the scope of the disclosed subject matter. In the drawings, like numbering represents like elements between the drawings.

DETAILED DESCRIPTION

The present disclosure describes various embodiments of an adjustable implant, such embodiments including intramedullary distraction and compression devices and/or adjustable spinal rods. The adjustable implant is configured to be externally controlled by an external adjustment device, and is therefore non-invasively adjustable. The adjustable implant has a compact size to enable adjustment (e.g., lengthening) of small bones. Further, the adjustable implant can be configured to enable precise load measurement while mitigating interference from implant components. In particular implementations, the adjustable implant can include a sleeve positioned between an actuation assembly and an adjustable member, where the sleeve is configured to move independently of the adjustable member to enable measurement of a load on the adjustable implant. In certain cases, the sleeve includes a load cell that permits measurement of the load on the adjustable implant from inside the implant, e.g., without direct measurement on a bone anchor. The adjustable implant can further include an ultrasound transducer for communicating load data with an external device.

FIGS. 1 and 2 show an adjustable implant 100 according to various implementations. FIG. 1 shows the adjustable implant 100 in an approximately fully extended position, and FIG. 2 shows the adjustable implant 100 in an approximately fully retracted position. In these embodiments, the adjustable implant 100 includes a housing 102 and an adjustable member 104. The adjustable member 104 is at least partially positioned within the housing 102 and is moveable relative to the housing 102. As shown, each of the housing 102 and adjustable member 104 can include one or more fixation apertures 106 for receiving fixation elements, e.g., bone screws, therein for affixing the housing 102 and the adjustable member 104 to respective sections of bone.

The housing 102 is configured to be affixed to a bone at a first location, and the adjustable member 104 is configured to be affixed to the bone at a second location. The first and second locations may be disposed on separate sections of the same bone, or on separate bones, e.g., in the case of a spinal rod. In order to grow or lengthen the bone, the bone either has a pre-existing separation or is purposely cut or broken (e.g., via an osteotomy) to create this separation, dividing the bone into a first section and a second section. The cut may be done prior to implanting and securing the adjustable implant 100 or may be done after the adjustable implant 100 is implanted, for example by use of a flexible Gigli saw. As described herein, the implant 100 is configured such that the adjustable member 104 can contract (e.g., for compression) and/or distract (e.g., for limb lengthening) relative to the housing 102. The adjustable implant 100 is configured to provide controlled, precise translation of the adjustable member 104 relative to the housing 102 by non-invasive remote control, and thus provide controlled, precise translation of the bone segment that is secured to the adjustable member 104 relative to the bone segment that is secured to the housing 102.

Over the treatment period for limb lengthening, the bone is regularly distracted, creating a new separation, into which osteogenesis can occur. "Regularly distracted" is meant to indicate that distraction occurs on a regular or periodic basis which may be on the order of every day or every few days. An exemplary distraction rate is one millimeter per day, although, other distraction rates may be employed. That is to say, a typical distraction regimen may include a daily increase in the length of the adjustable implant 100 by about one millimeter. This may be done, for example, by four lengthening periods per day, each having 0.25 mm of lengthening. The adjustable implant 100, as disclosed in more detail below, may include a magnetic drive system, which causes the adjustable member 104 to telescopically extend from the housing 102, thus forcing the first section and the second section of the bone apart from one another.

Turning to FIG. 3, at one end, the housing 102 has an opening 108 for receiving the adjustable member 104 in a cavity 131 of the housing 102. One or more o-rings, radial seals, or retainers can be positioned about the adjustable member 104 between the adjustable member 104 and the housing 102. In some embodiments, an intermediary member 110 is positioned between the housing 102 and the adjustable member 104. The intermediary member 110 provides for improved scaling and/or retention. Specifically, in some cases, the intermediary member 110 can provide an anti-rotation mechanism that prevents rotation of the adjustable member 104 relative to the housing 102. For example, an outer geometry of the adjustable member 104 and an inner geometry of the intermediary member 110 may complement and matingly engage one another. For example, the adjustable member 104 may have a cross sectional geometry that is oblong, elliptical, etc., and the opening 108 of the housing 102 may have a cross sectional geometry that is complementary to that of the adjustable member 104 and is therefore also oblong, elliptical, etc. In some embodiments, an outer cross sectional geometry of the adjustable member 104 and an inner cross sectional geometry of the intermediary member 110 may include one or more flat surfaces configured to matingly engage one another. The intermediary member 110 may include at least one groove facing an outer surface of the adjustable member 104 and at least one groove facing an inner surface of the housing 102. A seal 112 (e.g., a radial seal, o-ring, retainer, etc.) may be positioned within the at least one groove facing the outer surface of the adjustable member 104. In some embodiments, a portion of the outer surface of the adjustable member 104 and/or a portion of an internal surface of the housing 102 can be recessed to accommodate the seal 112. That is, the outer surface of the adjustable member 104 and/or a portion of an internal surface of the housing 102 can include complementary grooves facing the grooves formed within the intermediary member 110 for receiving the seal 112 therein. The intermediary member 110, including the seal 112 can help facilitate proper sealing between the housing 102 and the adjustable member 104 so that bodily fluid does not enter the housing 102 when the adjustable implant 100 is implanted. It is to be understood that any combination of seals 112 can be used within the intermediary member 110 without departing from aspects of the disclosure. Further, any of the scaling or retention features described in International Patent Application No. PCT/US2022/031709, filed on Jun. 1, 2022 (and hereby incorporated by reference in its entirety), can also be used without departing from aspects of the disclosure. Additionally, multi-seal configurations can be used to aid in sealing the adjustable member 104 relative to the housing 102, for example, as illustrated and described in U.S. patent application Ser. No. 17/815,694 (filed Jul. 28, 2022), which is hereby incorporated by reference in its entirety.

Figure 4:
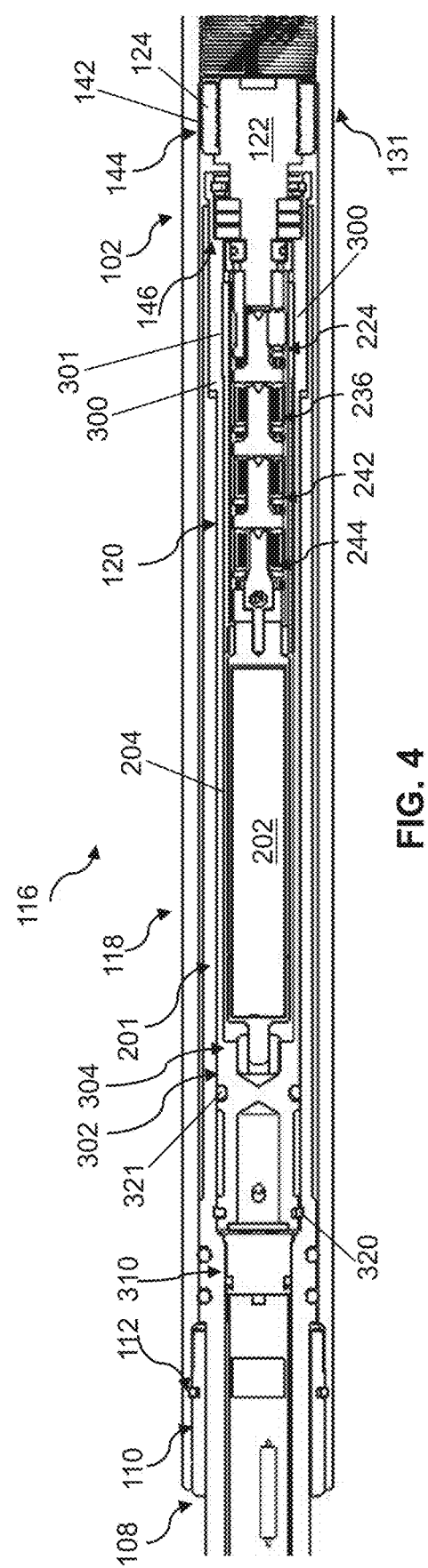
FIG. 4 is a cross-sectional view of an adjustable implant according to embodiments of the disclosure.

Turning to FIGS. 2-4, the adjustable implant 100 also includes an actuation assembly 116 positioned within the adjustable member 104 and configured to move the adjustable member 104 within the cavity 131 relative to the housing 102. The actuation assembly 116 includes an actuator 118 configured to drive rotational motion about a rotational axis of the actuator 118. The actuator 118 can take any of a variety of forms such as a motor or an externally driven rotatable permanent magnet. The actuator 118 may be axially fixed within the adjustable member 104 by one or more mechanical hardware components such as one or more bearings. In the embodiment illustrated in FIG. 4, the actuator 118 includes a rotatable magnetic assembly 201 that is located within the adjustable member 104. The magnetic assembly 201 can include a cylindrical, radially-poled permanent magnet 202 contained within a magnet housing 204. The permanent magnet 202 may include rare earth magnet materials, such as Neodymium-Iron-Boron. The permanent magnet 202 can have a protective Phenolic coating and may be held statically within the magnet housing 204 by epoxy or other adhesive. In various implementations, the magnet housing 204 and epoxy form a seal to further protect the permanent magnet 202. The magnet housing 204 may also be welded to create a hermetic seal. Additional details of the magnetic assembly 201 and magnetic housing 204 are included, for example, in U.S. patent application Ser. No. 17/815,694 (filed Jul. 28, 2022), previously incorporated by reference herein, as well as in U.S. Pat. Pub. 20190015138, published Jan. 17, 2019, which is incorporated herein by reference as if set forth in its entirety. Other magnetic assembly members may also be used, such as those disclosed in International Patent App. Pub. No. WO 2022/015898 A1, published Jan. 20, 2022; U.S. Pat. No. 8,734,488, published May 27, 2014; and U.S. Pat. Pub. 20130338714, published Dec. 19, 2013, each of which are incorporated herein by reference as if set forth in its entirety.

An external adjustment device 400 including an external magnet 414, 416 (see FIGS. 15-17) may be configured to actuate rotation of the actuator 118 in either of a first direction or a second direction about the rotational axis of the actuator 118. Rotation in the first direction may correspond to distraction of the adjustable member 104 and rotation in the second direction may correspond to retraction of the adjustable member 104. For instance, the driver 112 may be configured to rotate about the rotational axis in a first direction corresponding to distal translation of the adjustable member 104 (e.g., distraction), and to rotate in a second direction opposite the first direction corresponding to proximal translation of the adjustable member 104 along the axis (e.g., retraction, as in a compression procedure). Alternatively, the adjustable implant may include a motor configured to rotate in response to an electrical signal (e.g., as provided by an external device). The motor may be electrically coupled to a power source such as an implanted battery or charging capacitor to drive rotation. The power source may be configured for transcutaneous charging using an external power source.

As further shown by FIGS. 2-4, the actuation assembly 116 further includes a gear assembly 120 rotatably coupled to the actuator 118. The gear assembly 120 can include at least one stage of planetary gears. The embodiment illustrated in FIG. 4 includes four stages of gears, including a first stage 224, a second stage 236, a third stage 242, and a fourth stage 244. Although it should be understood that any number of stages may be implemented in various embodiments within the scope of the present disclosure. Each stage of the one or more stages of gears in gear assembly 120 may provide a gear reduction ratio. In various implementations, the four-stage gear assembly 120 enables a higher gear ratio than certain conventional adjustable implants, e.g., those with three-stage gear assemblies. The actuation assembly 116 further includes an output driver 122 rotatably coupled to the gear assembly 120, and a nut 124 disposed at least partially surrounding the output driver 122. The nut 124 may include an outer thread 142 (shown in detail in FIG. 4) configured to communicate with an internal thread 144 of the housing 102. The gear assembly 120 therefore couples to the magnetic assembly 201 at an input end thereof, and couples to the output driver 122 at an opposite, output end thereof, thereby coupling the magnetic assembly 201 to the output driver 122. Rotation of the magnetic assembly 201 therefore rotates the gear assembly 120, which in turn first stage 224, which in turn rotates the second stage 236, which in turn rotates the third stage 242, which in turn rotates the fourth stage 244, and which in turn rotates the output driver 122.

In various implementations, as illustrated in FIG. 4, the adjustable implant 100 further includes a sleeve 300 positioned radially between the actuation assembly 116 and the adjustable member 104. The sleeve 300 can be configured to move independently of the adjustable member 104 to enable measurement of a load on the adjustable implant 100. In certain implementations, the sleeve 300 surrounds the actuation assembly 116, e.g., around the axis of displacement of the adjustable implant 100. In particular cases, the sleeve 300 is circumferentially contiguous and wraps around the actuation assembly 116. In particular implementations, the sleeve 300 includes an anti-rotation mechanism 301 that enables the sleeve 300 to move axially independently of the adjustable member 104 without substantial rotation about the distraction axis.

In some implementations, the sleeve 300 includes a load cell 302 that is contained in the adjustable member 104. In certain cases, the load cell 302 is coupled with an end 304 of the actuation assembly 116. The load cell 302 can permit measurement of a load on the adjustable implant 100 from inside the adjustable implant 100. That is, the load cell 302 can enable measurement of the load on the adjustable implant 100 from a measurement location that is internal to the adjustable implant 100. In particular cases, the load cell 302 enables direct measurement of the internal load on the adjustable implant 100. Further, in contrast to conventional adjustable implants, the load cell 302 permits measurement of the load on the adjustable implant 100 without a direct measurement of load on a bone anchor (e.g., connected at apertures 106) coupling the adjustable implant 100 with a bone of a patient. In various implementations, the load cell 302 permits measurement of both a compressive load and a tensile load on the adjustable implant 100. That is, the load cell 302 can provide both compressive load data and tensile load data for use in distraction and/or compression applications.

Figure 5:
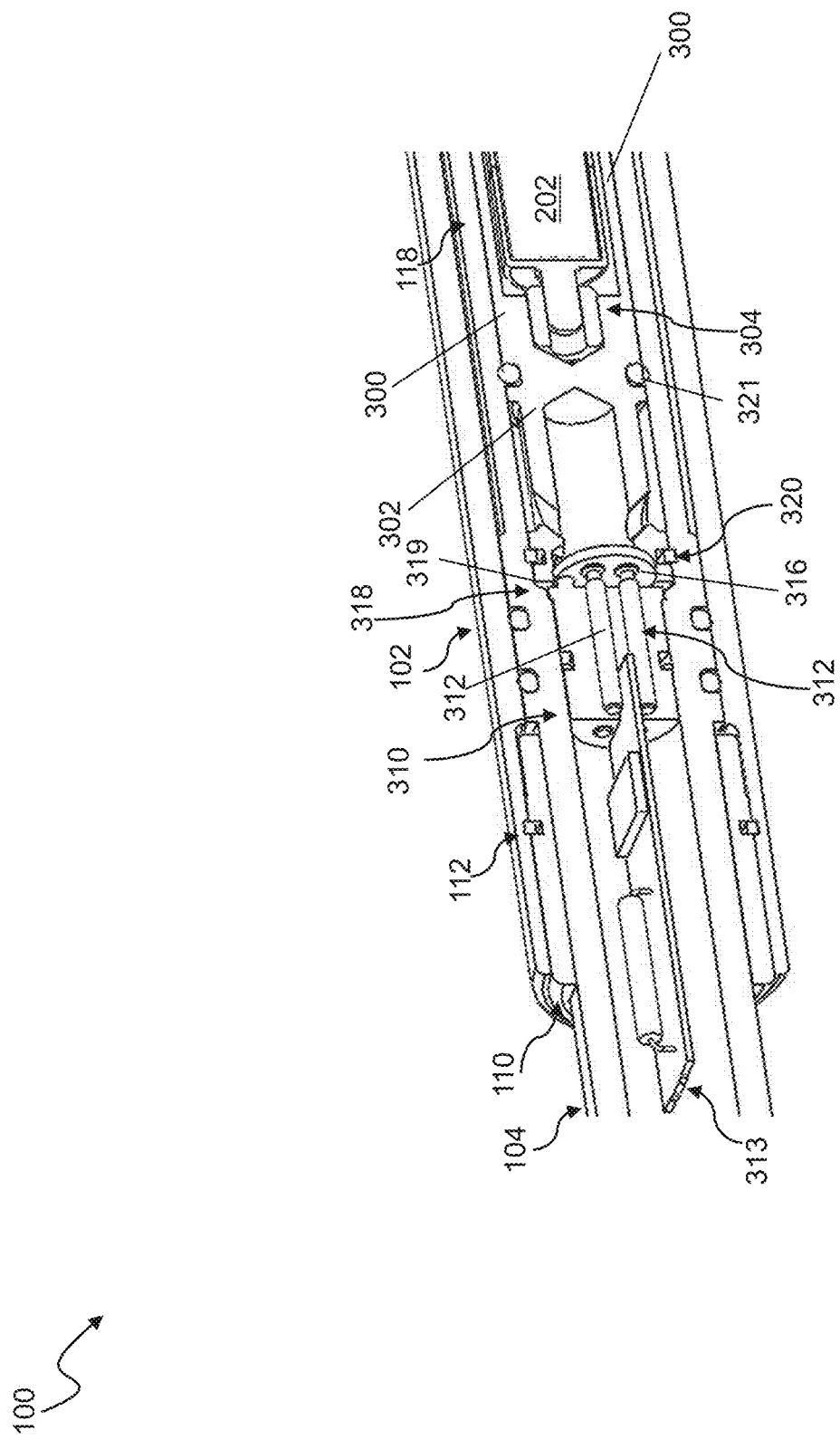
FIG. 5 is a perspective cut-away view of an adjustable implant according to embodiments of the disclosure.

As shown in FIG. 4, as well as the additional sectional view of the adjustable implant 100 in FIG. 5, a strain gage (or, gauge) 310 can be connected with the load cell 302 by a set of interconnections 312. In various implementations, the strain gauge 310 includes a circuit 313 configured to calculate a load value from detected strain. In some cases, an alignment pin 316 couples the strain gauge 310 with the load cell 302. In various implementations, the adjustable member 104 includes a shoulder 318 that is engaged with the alignment pin 316. In particular cases, the shoulder 318 engages an end 319 of the sleeve 300, which surrounds a portion of the alignment pin 316. Further, a retainer 320 can couple the load cell 302 with the adjustable member 104. In particular cases, one or more seals 321 (e.g., o-rings) are located within slots in the load cell 302 to aid in sealing the mechanism. Because the load cell 302 is coupled with both the sleeve 300 and the end 304 of the actuation assembly 116, the load cell 302 is positioned to measure the bi-directional load on the adjustable implant 100 based on relative load on the floating sleeve 300.

Figure 6:
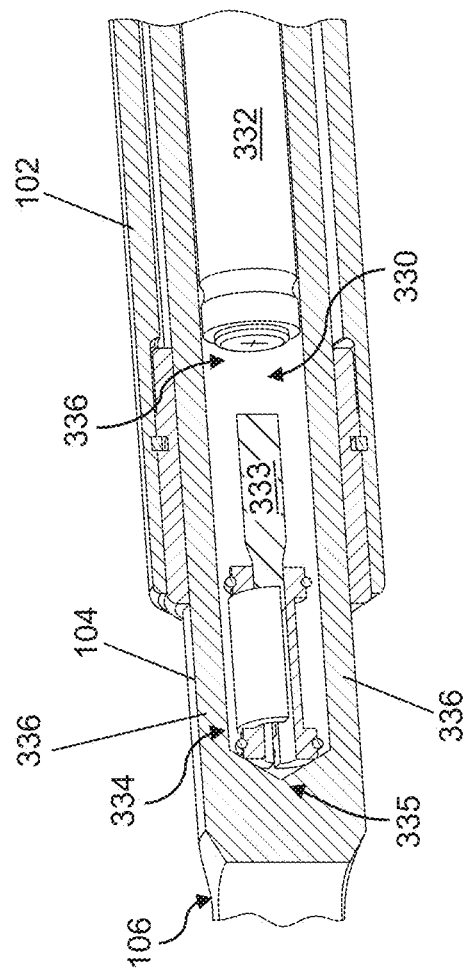
FIG. 6 illustrates a transducer in an adjustable implant in a first position, according to embodiments of the disclosure.
Figure 7:
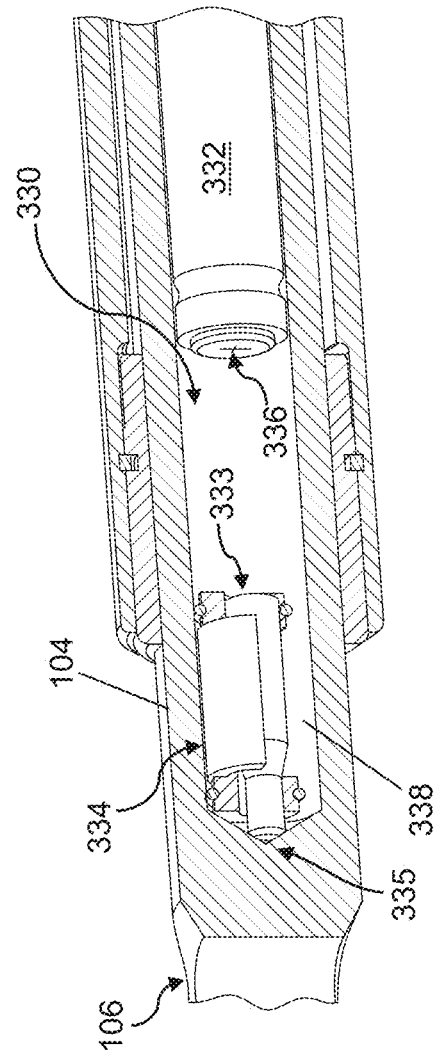
FIG. 7 illustrates the transducer in the implant of FIG. 6 in a second position.
Figure 8:
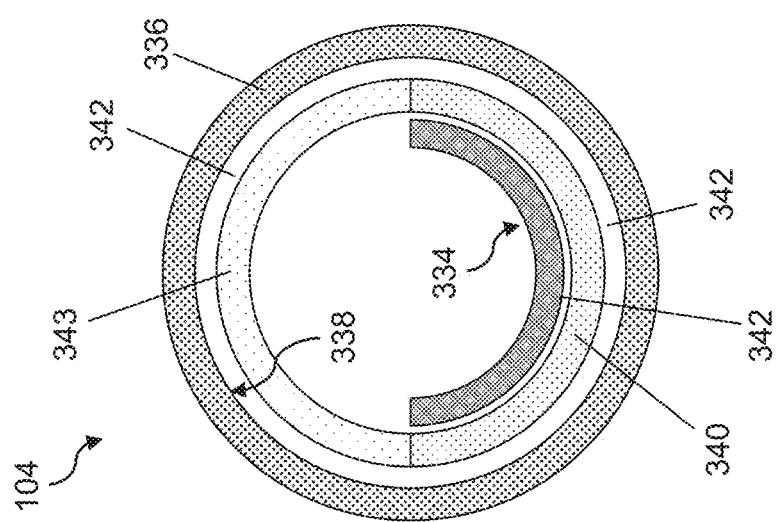
FIG. 8 is an end cross-sectional view of an adjustable implant illustrating bonding of a transducer to a wall according to embodiments of the disclosure.

In further implementations, as illustrated in FIGS. 6 and 7, the adjustable implant 100 further includes a battery slot 330 in the adjustable member 104 configured to receive a battery 332. In various implementations, the battery 332 is connected with a transducer 334. In certain example implementations, the transducer 334 includes an ultrasound transducer, e.g., a piezoelectric transducer. However, other transducer types can be used, for example, a magnetostrictive transducer. In various implementations, the transducer 334 is coupled (e.g., via wired connection) with the strain gauge 310 to enable receiving strain data and transmitting an indicator of strain data externally from the adjustable implant 100. In various implementations, an expander (or connector) 333 is configured to contact a positive terminal 336 of the battery 332. According to certain implementations, a conductive bonding material (e.g., epoxy) 342 (FIG. 8) is present along the outer radii of the transducer 334, and functions as a negative (or, ground) path. In certain cases, the battery 332 is wired to the circuit 313 (e.g., PCB board).

Figure 15:
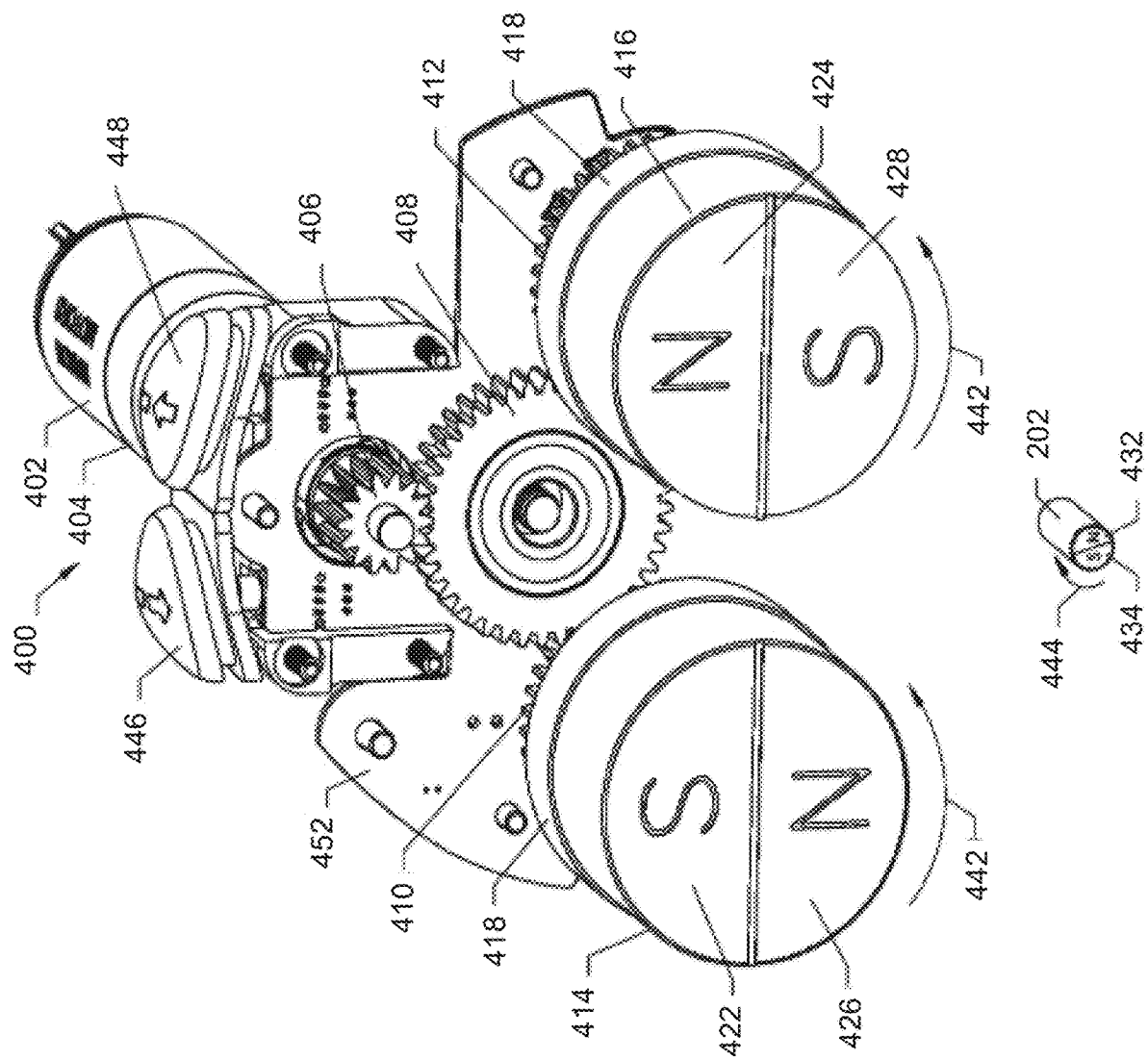
FIG. 15 shows internal components of an external adjustment device for non-invasively adjusting an adjustable implant according to embodiments of the disclosure.

As described herein, the transducer 334 can enable communication with an external device (e.g., receiver and/or controller such as the external adjustment device 400, FIG. 15) to provide load data about the adjustable implant 100. In a particular implementation, the transducer 334 is positioned such that the housing 102 does not obstruct signal transmission to or from the transducer 334 while the adjustable implant 100 is in a fully retracted state, e.g., as illustrated in FIGS. 6 and 7. In certain example implementations, the transducer 334 (e.g., piezoelectric transducer) is partially arcuate to enable directional control of ultrasonic signals. For example, the partially arcuate (e.g., piezoelectric) transducer 334 has a tuned signal strength in at least one direction. In other terms, the transducer 334 can have a greater signal strength in at least one direction relative to another direction, e.g., when considered radially, or approximately perpendicular to the direction of distraction/compression.

In certain examples, e.g., as illustrated in FIGS. 6 and 7, the transducer 334 abuts an outer wall 336 of the adjustable member 104. For example, the transducer 334 can abut the outer wall 336 of the adjustable member with only a bonding material therebetween (e.g., an epoxy). In certain of these examples, the transducer 334 is bonded directly to an inner surface 338 of the outer wall 336 without an air gap therebetween. This configuration can enhance signal strength in communication with the transducer 334, as air gap(s) can notably diminish the strength of ultrasonic signals traveling therethrough. In another implementation, as illustrated in the cross-sectional view of the adjustable implant 100 in FIG. 8, the (e.g., piezoelectric) transducer 334 is bonded to the inner surface 338 of the outer wall 336 with a titanium sleeve 340 therebetween, e.g., with one or more layers of bonding material 342 (e.g., epoxy such as silver epoxy). In various implementations, the bonding material 342 is conductive, i.e., enabling ultrasound transmission therethrough. In certain cases, an alignment sleeve 343 is coupled with the titanium sleeve 340 and spans partially annularly around the transducer 334. The alignment sleeve 343 can aid in aligning the titanium sleeve 340 adjacent to the transducer 334, e.g., to enable directional communication to/from the transducer 334.

As noted herein, the transducer 334 is an internal component to the adjustable implant 100. At least in part because of the location of the transducer 334 (within the battery slot 330 defined by the outer wall 336 of the adjustable member 104) while the implant is in the fully retracted position (e.g., FIG. 2), various implementations include a process of positioning the transducer 334 in the adjustable member. In certain cases, a bonding material 342 is applied to the transducer 334 (or any intervening sleeve(s), e.g., titanium sleeve 340), and the transducer 334 is then loaded from an opening in the adjustable member 104 to a base 335 of the battery slot 330 in the adjustable member 104. The bonding material 342 with the coupled transducer 334 can then be directly applied to the inner surface 338 of the outer wall 336 to bond the transducer 334 to the adjustable member 104. In some cases, a telescoping tool or elongated tool is used to load the transducer 334 into the battery slot 330. In various implementations, the bonding material 342 can include a self-curing material or an adhesive. In particular examples, the bonding material 342 includes an epoxy that is applicable with an approximately consistent thickness and no more than nominal air bubbles. In certain cases, the bonding material 342 is applied selectively to avoid contact with the positive inner surface of the transducer 334.

The adjustable implant 100 can include various additional beneficial features for enhancing use and/or the patient experience. For example, in additional implementations, as illustrated in FIGS. 3 and 4, the intermediary member 110 can be configured to function as an anti-rotation lug to limit rotation of the adjustable member 104 relative to the housing 102. For example, as noted herein, the intermediary member 110 can at least partially surround the adjustable member 104 and include one or more flat or non-rounded surfaces that function to limit rotation relative to the housing 102.

Further, in certain cases, threads 142 in housing 102 (FIG. 4) can have distinct thread pitches to control a distraction rate of the actuation assembly 116. For example, a first subset of the threads 142 has a first thread pitch, and a second subset of the threads 142 has a second, distinct thread pitch, enabling distinct distraction rates of the actuation assembly 116 when engaged with distinct subsets of threads.

As noted herein with respect to FIGS. 1-4, the gear assembly 120 can be controlled by the actuator 118. In some cases, e.g., where the actuator 118 includes a magnetic actuator, as illustrated in FIGS. 9-11, the adjustable implant 100 includes a locking mechanism 380 coupled with the gear assembly 120 for controlling distraction loss of the actuation assembly 116. In these cases, the magnetic actuator may be susceptible to distraction loss, and the locking mechanism 380 can mitigate that distraction loss. FIG. 9 shows a side cross-section of a portion of the gear assembly 120 including the locking mechanism 380, including a fixed ring gear 382, a keyed drive gear 384, and a keeper 386 that is configured to engage/disengage (or lock/unlock) to function as a distraction loss mechanism. Engaging and disengaging the ring gear 382 can be controlled by actuation of a magnet 388, e.g., rotation of the magnet 388 to engage/disengage the ring gear 382. A tab (or, protrusion) 390 on the keeper 386 can be configured to engage/disengage teeth 392 in the ring gear 382 to engage/disengage the locking mechanism 380. FIG. 10 illustrates the locking mechanism 380 in a locked (engaged) position, and FIG. 11 illustrates the locking mechanism 380 in an unlocked (disengaged) position. Additional details of this locking mechanism 380 are described and illustrated in U.S. patent application Ser. No. 17/815,694 (previously incorporated by reference herein). In other implementations, the actuator 118 includes a motor with an integrated distraction loss mechanism.

Figure 12:
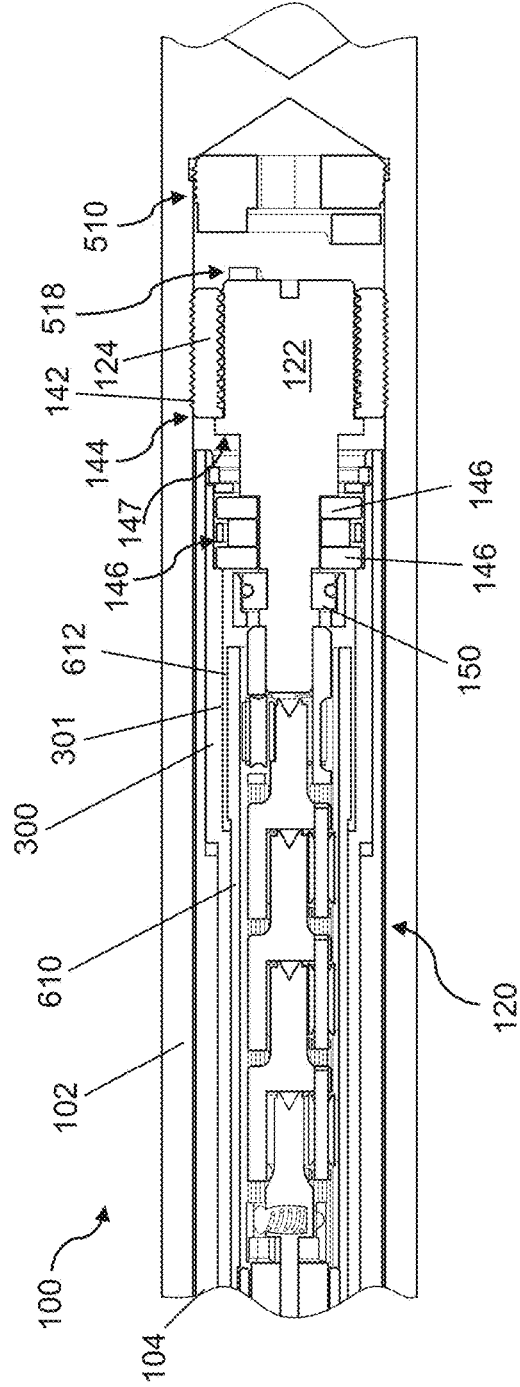
FIGS. 12-14 illustrate anti-rotation and anti-jam features in an adjustable implant according to embodiments of the disclosure.
Figure 14:
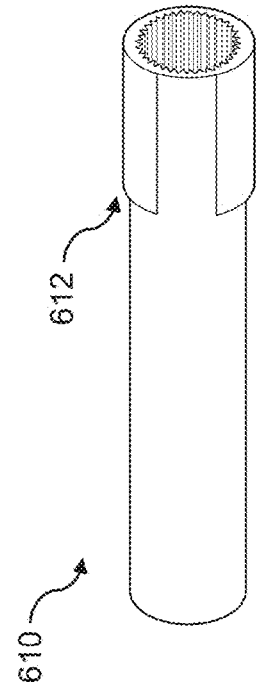
Figure 13:
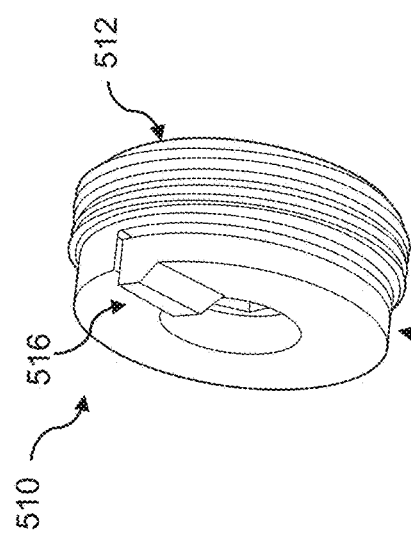

In various additional implementations, the adjustable implant 100 is configured to mitigate jamming (or, sticking) during use. For example, as illustrated in FIGS. 12-14, the adjustable implant 100 can include an anti-jam member 510 in the cavity 131 for preventing the adjustable member 104 from getting jammed or otherwise undesirably caught in the housing 102. The anti-jam member 510 can include a set of threads 512 for engaging the internal threads 144 in the housing, along with a spring mechanism 514 with a tab 516 for selectively engaging a protrusion 518 on the output driver 122. Further features of the anti-jam member 510 are described and illustrated, e.g., in U.S. patent application Ser. No. 17/815,694 (previously incorporated by reference herein).

In further implementations, as noted herein, the gear assembly 120 can include one or more features to enhance beneficial operation of the adjustable implant 100. For example, the gear assembly 120, which can include a set of gear stages (e.g., four stages), can include one or more sun gears, planetary gears and/or ring gears. In a particular example shown in FIGS. 12 and 14, the gear assembly 120 includes a ring gear 610 that has an anti-rotation feature 612. The anti-rotation feature 612 can include one or more flat or non-rounded sections that prevent the ring gear 610 from rotating relative to the sleeve 300. Additionally, as illustrated in FIG. 12, the implant can further one or more thrust bearings 146 and associated retainer clips 150. In some embodiments, a thrust bearing 146 is positioned about at least a portion of the output driver 122 within the adjustable member 104. The thrust bearings 146 serve to protect the magnetic assembly 201 (FIG. 4) and the gear assembly 120 of the drive system from any significant compressive or tensile stresses. When there is a compressive force on the adjustable implant 100, for example, when distracting a bone, and thus resisting the tensile strength of the soft tissues, the thrust bearing(s) 146 abut against the retainer clip(s) 150 and/or a ledge 147 on the output driver 122. For example, in certain compressive applications it is the goal to hold two fractured sections of a bone together. Because the bone may have fractured in a non-uniform or shattered pattern, it may be difficult to determine the desired length of the adjustable implant 100 until after it is implanted and fully attached. In these situations, it may be preferred to place a slightly extended adjustable implant 100, secure the adjustable implant 100, and then magnetically retract the adjustable implant 100 after it has been secured within the bone fragments. In this manner, the adjustable implant 100 may apply the desired compression between the two fragments. In such compressive applications, the adjustable implant 100 is under tensile forces and the thrust bearing(s) 146 would abut against the retainer clip(s) 150 or a ledge 147. In both situations, the thrust bearings 146 and the ledge 147 take the large stresses, rather than the magnetic assembly 201 or gear assembly 120 of the drive system. Additional details of example gear stages and components is included, e.g., in U.S. patent application Ser. No. 17/815,694 (previously incorporated by reference herein).

Figure 16:
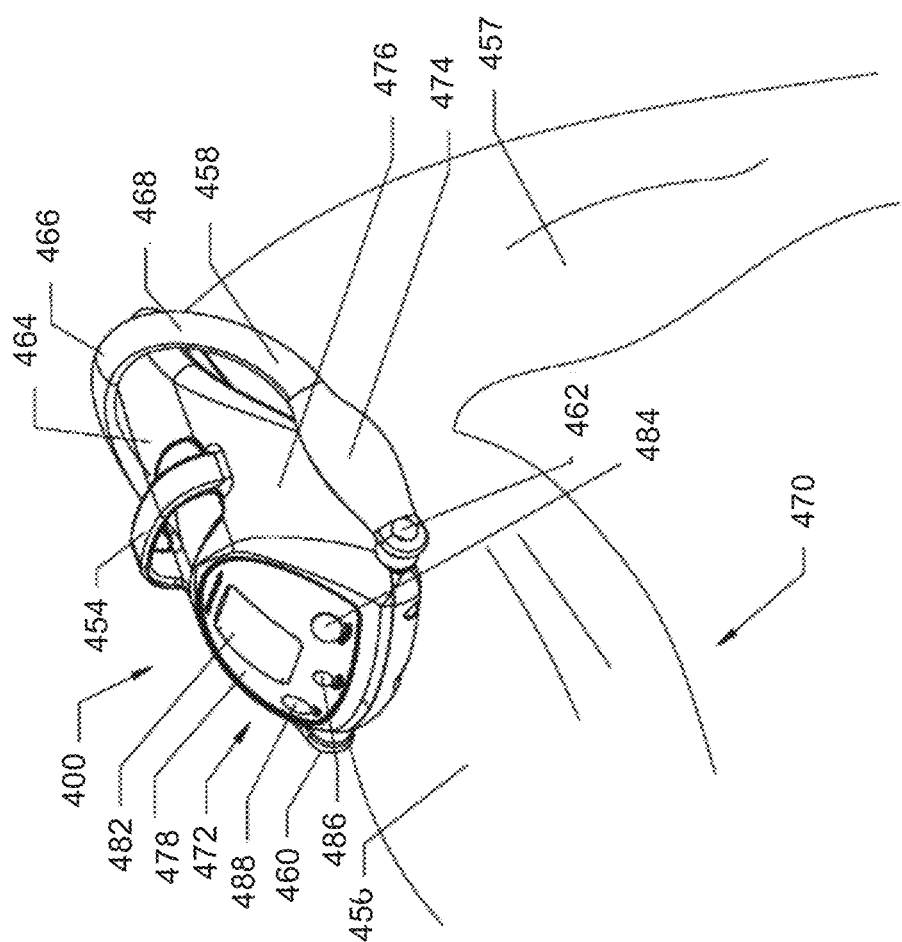
FIGS. 16 and 17 show external adjustment devices in configurations for adjusting an adjustable implant that is implanted within a femur, and within a tibia, respectively, in accordance with embodiments of the disclosure.
Figure 17:
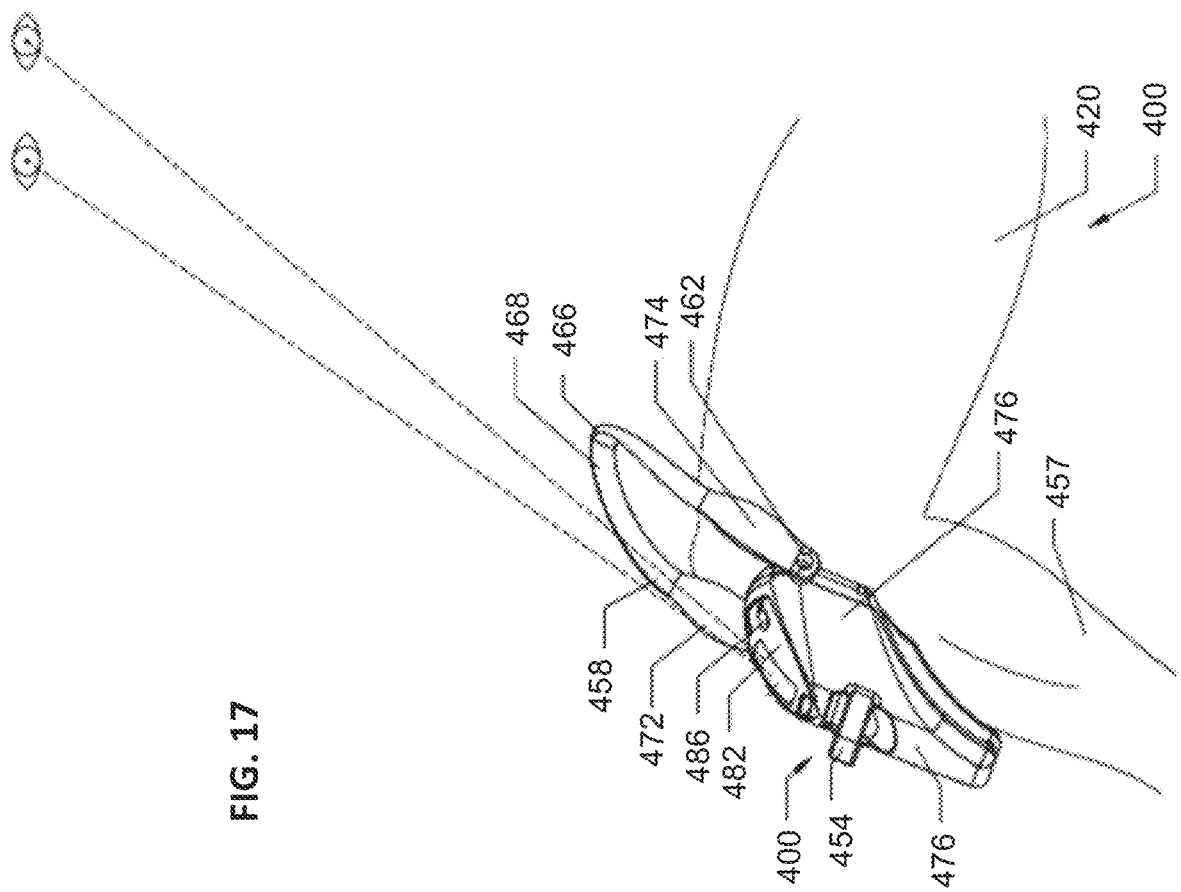

FIGS. 15-17 illustrate an external adjustment device 400 configured for applying a moving magnetic field to allow for non-invasive adjustment of the adjustable implant 100 by turning a permanent magnet 202 within the adjustable implant 100, as described. FIG. 15 illustrates the internal components of the external adjustment device 400, and for clear reference, shows the permanent magnet 202 of the adjustable implant 100 without the rest of the assembly. The internal working components of the external adjustment device 400 may, in certain embodiments, be similar to that described in U.S. Patent Application Publication No. 2012/0004494, which is incorporated by reference herein. A motor 402 with a gear box 404 outputs to a motor gear 406. Motor gear 406 engages and turns central (idler) gear 408, which has the appropriate number of teeth to turn first and second magnet gears 410, 412 at identical rotational speeds. First and second magnets 414, 416 turn in unison with first and second magnet gears 410, 412, respectively. Each magnet 414, 416 is held within a respective magnet cup 418 (shown partially). An exemplary rotational speed is 60 RPM or less. This speed range may be desired in order to limit the amount of current density induced in the body tissue and fluids, to meet international guidelines or standards. As seen in FIG. 15, the south pole 422 of the first magnet 414 is oriented the same as the north pole 424 of the second magnet 416, and likewise, the first magnet 414 has its north pole 426 oriented the same as the south pole 428 of the second magnet 416. As these two magnets 414, 416 turn synchronously together, they apply a complementary and additive moving magnetic field to the radially-poled, permanent magnet 202, having a north pole 432 and a south pole 434. Magnets having multiple north poles (for example, two) and multiple south poles (for example, two) are also contemplated in each of the devices. As the two magnets 414, 416 turn in a first rotational direction 442 (e.g., counter-clockwise), the magnetic coupling causes the permanent magnet 202 to turn in a second, opposite rotational direction 444 (e.g., clockwise). The rotational direction of the motor 402 and corresponding rotational direction of the magnets 414, 416 is controlled by buttons 446, 448. One or more circuit boards 452 contain control circuitry for both sensing rotation of the magnets 414, 416 and controlling the rotation of the magnets 414, 416.

FIGS. 16 and 17 show the external adjustment device 400 for use with an adjustable implant 100 placed in the femur (FIG. 16) or the tibia (FIG. 17) or an adjustable implant placed along a spinal curvature. The external adjustment device 400 has a first handle 454 for carrying or for steadying the external adjustment device 400, for example, steadying it against an upper leg 456 (as in FIG. 16) or lower leg 457 as in (FIG. 17). An adjustable handle 458 is rotationally attached to the external adjustment device 400 at pivot points 460, 462. Pivot points 460, 462 have easily lockable/unlockable mechanisms, such as a spring-loaded brake, ratchet, or tightening screw, so that a desired angulation of the adjustable handle 458 in relation to the housing 464 can be adjusted and locked in orientation. The adjustable handle 458 is shown in two different positions in FIGS. 16 and 17. In FIG. 16, the adjustable handle 458 is set so that the apex 466 of the loop 468 rests against the housing 464. In this position, the patient 470 is able to hold onto one or both of the grips 472, 474 while the adjustment procedure (for example transporting bone between 0.10 mm to 1.50 mm) is taking place. It is contemplated that the procedure could also be a lengthening procedure for a bone lengthening device or a lengthening procedure for a lengthening plate which is attached external to the bone. Turning to FIG. 17, when the adjustable implant 100 is implanted in a tibia, the adjustable handle 458 may be changed to a position in which the patient 470 can grip onto the apex 466 so that the magnet area 476 of the external adjustment device 400 is held over the portion the adjustable implant 100 containing the permanent magnet 202. In both cases, the patient 470 is able to clearly view the control panel 478 including a display 482. In a different configuration from the two directional buttons 414, 416 in FIG. 15, the control panel 478 includes a start button 484, a stop button 486 and a mode button 488. Control circuitry contained on circuit boards 452 may be used by the surgeon to store important information related to the specific aspects of each particular patient. For example, in some patients an implant may be placed antegrade into the tibia. In other patients the implant may be placed either antegrade or retrograde about the femur. In still other patients, the implant may be placed about an area of curvature in the spine of the patient. In each of these cases, it may be desired to move the bone either from distal to proximal or from proximal to distal. By having the ability to store information of this sort that is specific to each particular patient within the external adjustment device 400, the external adjustment device 400 can be configured to direct the magnets 414, 416 to turn in the correct direction automatically, while the patient need only place the external adjustment device 400 at the desired position, and push the start button 484. The information of the maximum allowable bone transport length per day and maximum allowable bone transport length per session can also be input and stored by the surgeon for safety purposes. These may also be added via an SD card or USB device, or by wireless input. An additional feature is a camera at the portion of the external adjustment device 400 that is placed over the skin. For example, the camera may be located between first magnet 414 and second magnet 416. The skin directly over the implanted permanent magnet 202 may be marked with indelible ink. A live image from the camera is then displayed on the display 482 of the control panel 478, allowing the user to place the first and second magnets 414, 416 directly over the area marked on the skin. Crosshairs can be overlaid on the display 482 over the live image, allowing the user to align the mark on the skin between the crosshairs, and thus optimally place the external adjustment device 400.

Other external adjustment devices can be used to cause actuation of the distraction devices described herein. Such external adjustment devices include, for example, those described in U.S. Pat. No. 8,382,756, published on Feb. 26, 2013; U.S. Pat. No. 9,248,043, published on Feb. 2, 2016; U.S. Pat. No. 9,078,711, published on Jul. 14, 2015; U.S. Pat. No. 9,044,281, published on Jun. 2, 2015; U.S. Pat. No. 11,246,694, published on Feb. 15, 2022; U.S. Pat. App. Pub. No. 2016/0113683 A1, published on Apr. 28, 2016; U.S. Pat. No. 10,835,290, published on Nov. 17, 2020; and International Patent App. No. PCT/US2020/017338, published as WO 2020/163800 A1 on Aug. 13, 2020, all of which are incorporated herein by reference as if set forth in their entirety.

In addition to approaches for actuating the actuator 118 to adjust the adjustable implant 100, various approaches can include measuring the load on the adjustable implant 100, e.g., via the transducer 334 and the load cell 302. In these cases, the external adjustment device 400 (or another computing device such as a smartphone, tablet, etc.) can be configured to measure the load on the adjustable implant 100. In such cases, the external adjustment device 400 (or other computing device) is configured to receive an indicator of a load on the adjustable implant 100 via the transducer 334. In certain cases, the external adjustment device 400 is configured to compare that indicator of the load (e.g., load data such as one or more load values or range(s) of loads) with a load threshold. In some cases, the load threshold is patient-specific, device specific (e.g., based on the size of implant 100), and/or treatment-plan specific (e.g., based on an aggregate adjustment schedule over a period). In some aspects, where the indicator of the load deviates from the threshold, an approach can include actuating the actuator 118 to adjust the adjustable implant 100. In particular examples, iterative adjustments can be made to the adjustable implant 100 via the actuator 100 based on successive indicators of load, e.g., via transducer 334 and load cell 302, until the indicator of load satisfies the threshold(s).

In any case, in contrast to certain conventional implants and approaches, various disclosed embodiments allow for efficient and effective intramedullary bone adjustment. The disclosed implants can have a compact footprint while enabling high gear ratio adjustment for flexibility in adjustment. Further, the disclosed implants can provide precise load data (e.g., wirelessly) with a direct load measurement from the implant. This load data can be used to more precisely assess aspects of the bone adjustment as well as stresses on the implant. Further, the disclosed implants can enable effective communication of load data via a transducer configuration that enhances signal transmission and quality. These and other features (e.g., anti-rotation features, anti-jam features) provide an adjustable implant that enhances the patient experience and improves procedural outcomes for the provider.

Additionally, the load data provided by the disclosed implants can help medical professionals (e.g., surgeons) to assess bone regeneration quality, and establish and/or modify treatment protocols. For example, if the distraction rate for the implant is too slow (as indicated by reduced load on the implant corresponding with increased calcification), the surgeon can modify the distraction rate accordingly. Further, once the load on the implant reaches a threshold (e.g., lower threshold), that load value may indicate desired healing (or calcification). The surgeon can then order a verification of the healing (e.g., via imaging such as an x-ray), and subsequently remove the implant if the healing is confirmed.

While implementations above are primarily in the context of externally magnetically driven systems, other drive systems can be used. For example, in addition to or instead of the magnet-based driving, one or more of the drive elements can take the form of an implanted electric motor. The implanted electric motor can be powered by an external power source (e.g., via a radiofrequency link, via an ultrasonic energy transfer technique, via an inductive connection, via another technique, or via combinations thereof) or an implanted power source (e.g., a battery, which may be charged by the external power source). The implanted power source may be within the implant (e.g., within a housing thereof) or separate from the implant and coupled to the implant via a cable.

Commonly labeled components in the FIGURES are considered to be substantially equivalent components for the purposes of illustration, and redundant discussion of those components is omitted for clarity. Further, as used herein, the term "approximately" can refer to a defined value, plus or minus several percent.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on." such that an unrecited feature or element is also permissible.

The terminology used herein is for the purpose of describing particular embodiments only and is not intended to be limiting of the disclosure. As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups. As used herein, "substantially" refers to largely, for the most part, entirely specified or any slight deviation which provides the same technical benefits of the disclosure.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

We claim:

1. An adjustable implant comprising:
   a housing having an internal thread and defining a cavity within the housing;
   an adjustable member at least partially positioned within the housing and moveable relative to the housing within the cavity;
   an actuation assembly positioned within the adjustable member and configured to move the adjustable member relative to the housing, the actuation assembly including:
     an actuator;
     a gear assembly coupled to the actuator; and
     an output driver coupled to the gear assembly; and
   a sleeve positioned radially between the actuation assembly and the adjustable member, the sleeve configured to move independently of the adjustable member to enable measurement of a load on the adjustable implant and comprising an anti-rotation mechanism that enables the sleeve to move axially independently of the adjustable member without substantial rotation about a distraction axis.

2. The adjustable implant of claim 1, wherein the sleeve surrounds the actuation assembly.

3. The adjustable implant of claim 1, wherein the sleeve includes a load cell contained in the adjustable member.

4. The adjustable implant of claim 3, wherein the load cell is coupled with an end of the actuation assembly.

5. The adjustable implant of claim 3, wherein the load cell permits measurement of the load on the adjustable implant from inside the adjustable implant.

6. The adjustable implant of claim 3, wherein the load cell permits measurement of the load on the adjustable implant without a direct measurement of load on a bone anchor coupling the adjustable implant with a bone of a patient.

7. The adjustable implant of claim 3, wherein the load cell permits measurement of both a compressive load and a tensile load on the adjustable implant.

8. The adjustable implant of claim 3, further comprising a strain gage connected with the load cell by a set of interconnects.

9. The adjustable implant of claim 8, wherein the strain gage includes a circuit for calculating a load value from detected strain.

10. The adjustable implant of claim 8, wherein the strain gage is coupled with a transducer for transmitting load value data from the adjustable implant.

11. The adjustable implant of claim 1, wherein the internal thread of the housing comprises distinct thread pitches to control a distraction rate of the actuation assembly.

12. The adjustable implant of claim 1, further comprising:
    a battery;
    wherein the actuator includes a motor powered by the battery, the motor having an integrated distraction loss mechanism.

13. The adjustable implant of claim 1, wherein the gear assembly includes a ring gear comprising an anti-rotation feature.

14. The adjustable implant of claim 1, wherein the gear assembly includes a gear assembly of at least four stages.

15. The adjustable implant of claim 1, further comprising a battery slot in the adjustable member and a battery in the battery slot.

16. An adjustable implant comprising:
    a battery;
    a housing having an internal thread and defining a cavity within the housing;
    a transducer connected to the battery and positioned such that the housing does not obstruct signal transmission to or from the transducer while the adjustable implant is in a fully retracted state;
    an adjustable member at least partially positioned within the housing and moveable relative to the housing within the cavity;
    an actuation assembly positioned within the adjustable member and configured to move the adjustable member relative to the housing, the actuation assembly including:
      an actuator powered by the battery;
      a gear assembly coupled to the actuator; and
      an output driver coupled to the gear assembly; and
    a sleeve located radially between the actuation assembly and the adjustable member, the sleeve including a load cell coupled with the transducer and comprising an anti-rotation mechanism that enables the sleeve to move axially independently of the adjustable member without substantial rotation about a distraction axis.

17. The adjustable implant of claim 16, wherein the transducer is configured to transmit signals about a load on the adjustable implant detected by the load cell.

18. The adjustable implant of claim 16, wherein the sleeve is configured to move independently of the adjustable member to enable measurement of a load on the adjustable implant.

19. The adjustable implant of claim 16, wherein the gear assembly includes at least four stages.

* * * * *